US012591816B2

(12) United States Patent
Chen et al.

(10) Patent No.: US 12,591,816 B2
(45) Date of Patent: Mar. 31, 2026

(54) MACHINE LEARNING GENERATED PREDICTIVE MODEL TO FORECAST THE DYNAMIC FLUX DISTRIBUTIONS OF ULTRA-RELATIVISTIC ELECTRONS

(71) Applicant: TRIAD National Security, LLC., Los Alamos, NM (US)

(72) Inventors: Yue Chen, Los Alamos, NM (US); Youzuo Lin, Los Alamos, NM (US); Rafael Pires de Lima, Los Alamos, NM (US); Saurabh Sinha, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 1152 days.

(21) Appl. No.: 17/499,591

(22) Filed: Oct. 12, 2021

(65) Prior Publication Data

US 2023/0153699 A1     May 18, 2023

(51) Int. Cl.
*G06N 20/20*          (2019.01)
*G01T 5/00*          (2006.01)
(52) U.S. Cl.
CPC .............. *G06N 20/20* (2019.01); *G01T 5/00* (2013.01)
(58) Field of Classification Search
CPC ........ G06N 20/20; G06N 3/044; G06N 3/045; G06N 3/047; G06N 3/08; G06N 3/084; G01T 5/00; G01T 1/00
See application file for complete search history.

(56) References Cited

PUBLICATIONS

Wei, L., Zhong, Q., Lin, R., Wang, J., Liu, S., & Cao, Y. (2018). Quantitative prediction of high-energy electron integral flux at geostationary orbit based on deep learning. Space Weather, 16, 903-916. https://doi.org/10.1029/2018SW001829 (Year: 2018).*
Baker, D. N., Kanekal, S. G., Hoxie, V. C., Batiste, S., Bolton, M., Li, X., et al. (2012). The Relativistic Electron-Proton Telescope (REPT) instrument on board the Radiation Belt Storm Probes (RBSP) spacecraft: Characterization of Earth's radiation belt high-energy particle populations. Space Science Reviews, 179, 337-381. https://doi.org/10.1007/s11214-012-9950-9.
Blake, J. B., Kolasinski, W. A., Filius, R. W., & Mullen, E. G. (1992). Injection of electrons and protons with energies of tens of MeV into L<3 on Mar. 24, 1991. Geophysical Research Letters, 19, 821-824. https://doi.org/10.1029/92gl00624.
(Continued)

*Primary Examiner* — Robert H Kim
*Assistant Examiner* — Christopher J Gassen

(57) ABSTRACT

A method includes receiving a plurality of data sets, wherein the plurality of data sets includes a measured low-energy electrons that is less than or equal to 1.5 MeV, and wherein the plurality of data sets further includes data associated with solar wind. The method further includes receiving measured data associated with higher electron events of greater than or equal to 2 MeV. In response to a selection of at least two data sets from the plurality of data sets, and further in response to a selection of one or more machine learning (ML) algorithms from a plurality of ML algorithms, and further in response to a selection of a number of window size, a plurality of ML models is generated based on the selections as an input and the measured data associated with higher electron events of greater than or equal to 2 MeV as its output.

23 Claims, 24 Drawing Sheets

(56)                    References Cited

PUBLICATIONS

Boynton, R. J., Balikhin, M. A., & Mourenas, D. (2014). Statistical analysis of electron lifetimes at GEO: Comparisons with chorus-driven losses. Journal of Geophysical Research: Space Physics, 119, 6356-6366. https://doi.org/10.1002/2014JA019920.

Chen, Y., Reeves, G. D., Cunningham, G. S., Redmon, R. J., & Henderson, M. G. (2016). Forecasting and remote sensing outer belt relativistic electrons from low Earth orbit. Geophysical Research Letters, 43, 1031-1038. https://doi.org/10.1002/2015gl067481.

Chen, Y., Reeves, G. D., Fu, X., & Henderson, M. (2019). PreMevE: New predictive model for megaelectron-volt electrons inside Earth's outer radiation belt. Space Weather, 17, 438-454. https://doi.org/10.1029/2018sw002095.

Cheung, K. K. W. (2001). A review of ensemble forecasting techniques with a focus on tropical cyclone forecasting. Meteorological Applications, 8, 315-332. https://doi.org/10.1017/s1350482701003073.

Claudepierre, S. G., & O'Brien, T. P. (2020). Specifying high-altitude electrons using low-altitude LEO systems: The SHELLS model. Space Weather, 18, e2019sw002402. https://doi.org/10.1029/2019sw002402.

Claudepierre, S. G., O'Brien, T. P., Blake, J. B., Fennell, J. F., Roeder, J. L., Clemmons, J. H., et al. (2015). A background correction algorithm for Van Allen Probes MagEIS electron flux measurements. Journal of Geophysical Research: Space Physics, 120, 5703-5727. https://doi.org/10.1002/2015JA021171.

Clevert, D.-A., Unterthiner, T., & Hochreiter, S. (2015). Fast and accurate deep network learning by exponential linear units (ELUs). ArXiv E-Prints, arXiv, 1511, 07289.

Fennell, J. F., Claudepierre, S. G., Blake, J. B., O'Brien, T. P., Clemmons, J. H., Baker, D. N., et al. (2015). Van Allen Probes show that the inner radiation zone contains no MeV electrons: ECT/MagEIS data. Geophysical Research Letters, 42, 1283-1289. https://doi.org/10.1002/2014GL062874.

Friedel, R. H. W., Bourdarie, S., & Cayton, T. E. (2005). Intercalibration of magnetospheric energetic electron data. Space Weather, 3, S09B04. https://doi.org/10.1029/2005SW000153.

Hahnloser, R. H. R., Sarpeshkar, R., Mahowald, M. A., Douglas, R. J., & Seung, H. S. (2000). Digital selection and analogue amplification coexist in a cortex-inspired silicon circuit. Nature, 405(6789), 947-951. https://doi.org/10.1038/35016072.

Knipp, D. J. (2016). Advances in space weather ensemble forecasting. Space Weather, 14, 52-53. https://doi.org/10.1002/2016SW001366.

Li, W., & Hudson, M. K. (2019). Earth's Van Allen radiation belts: From discovery to the Van Allen Probes era. Journal of Geophysical Research: Space Physics, 124, 8319-8351. https://doi.org/10.1029/2018JA025940.

Meier, M. M., Belian, R. D., Cayton, T. E., Christensen, R. A., Garcia, B., Grace, K. M., et al. (1996). The energy spectrometer for particles (ESP): Instrument description and orbital performance. In Workshop on the Earth's trapped particle environment (vol. 383, pp. 203-210). American Institute of Physics Conference. ROC. https://doi.org/10.1063/1.51533.

Nair, V., & Hinton, G. E. (2010). Rectified linear units improve restricted Boltzmann machines. Proceedings of the 27th International Conference on International Conference on Machine Learning, Omnipress (pp. 807-814). Retrieved from http://dl.acm.org/citation.cfm?id=3104322.3104425.

Pires de Lima, R., Chen, Y., & Lin, Y. (2020). Forecasting megaelectron-volt electrons inside Earth's outer radiation pelt: PreMevE 2.0 based on supervised machine learning algorithms. Space Weather, 18, e2019SW002399. https://doi.org/10.1029/2019sw002399.

Reagan, J. B., Meyerott, R. E., Gaines, E. E., Nightingale, R. W., Filbert, P. C., & Imhof, W. L. (1983). Space charging currents and their effects on spacecraft systems. IEEE Transactions on Electrical Insulation, 18, 354-365. https://doi.org/10.1109/tei.1983.298625.

Sicard-Piet, A., Bourdarie, S., Boscher, D., Friedel, R. H. W., Thomsen, M., Goka, T., et al. (2008). A new international geostationary electron model: IGE-2006, from 1 keV to 5.2 MeV. Space Weather, 6, S07003. https://doi.org/10.1029/2007SW000368.

Toth, Z., & Kalnay, E. (1997). Ensemble forecasting at NCEP and the breeding method. Monthly Weather Review, 125, 3297-3319. https://doi.org/10.1175/1520-0493(1997)125<3297:efanat>2.0.co;2.

Vette, J. (1991). The AE-8 trapped electron model environment (NASA-TM-107820). NASA Technical Memorandum. Retrieved from https://ntrs.nasa.gov/citations/19920014985.

* cited by examiner

Training Phase
100A
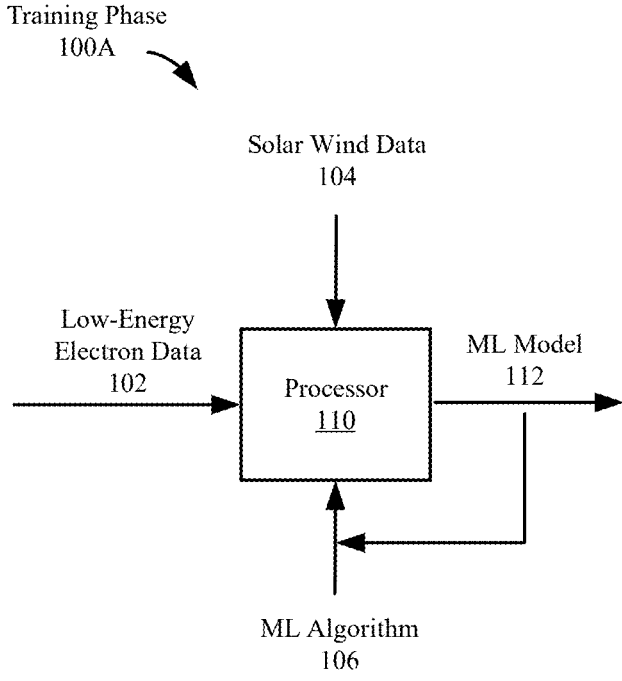
Validation/Testing
(Live Operation)
100B
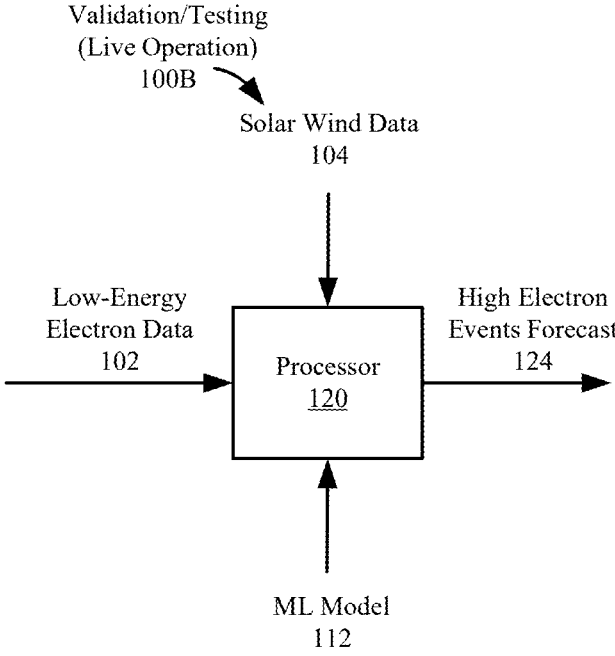
Figure 1A Model Performance with Different Inputs (> 2 MeV, 25 hr Forecasts)

Model Performance for Ensemble Models (> 2 MeV)

Figure 2M

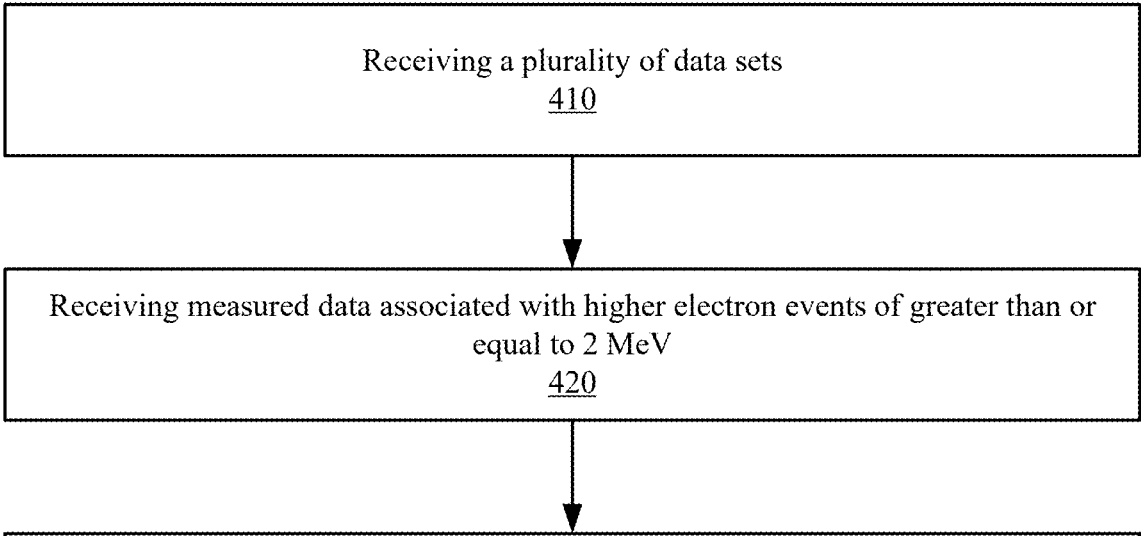

Receiving a plurality of data sets
410

Receiving measured data associated with higher electron events of greater than or
equal to 2 MeV
420

In response to a selection of at least two data sets from the plurality of data sets, and
further in response to a selection of one or more machine learning (ML) algorithms
from a plurality of ML algorithms, and further in response to a selection of a number
of window size, generating a plurality of ML models based on the selections as an
input and the measured data associated with higher electron events of greater than or
equal to 2 MeV as its output
430

Figure 4

MACHINE LEARNING GENERATED PREDICTIVE MODEL TO FORECAST THE DYNAMIC FLUX DISTRIBUTIONS OF ULTRA-RELATIVISTIC ELECTRONS

FEDERALLY SPONSORED RESEARCH OR DEVELOPMENT

The United States government has rights in this invention pursuant to Contract Number 89233218CNA000001 Between the U.S. Department of Energy and Triad National Security, LLC for operation of Los Alamos National Laboratory. The government has certain rights in the invention.

BACKGROUND

Energetic particles (electrons and/or protons) magnetically trapped inside the Earth's Van Allen radiation belts present a serious concern for space operations. These particles are usually present in a two-belt distribution, an inner belt in the region with equatorial distances (i.e., L-shells or simply L) within ~2-3 Earth radii and an outer belt with ~3<L<8 separated by the slot region in between. Deep injections of Megaelectron-volt (MeV) electrons into the outer belt, often occurred during geomagnetic storms, are called MeV electron events in which electron intensities may vary up to several orders of magnitude. These energetic electrons pose a major space radiation risk, not only in term of the ionizing dose, but also due to the deep dielectric charging and discharging phenomena, for satellites operating in orbits with high apogees including geosynchronous orbit (GEO), geosynchronous-transfer-orbit (GTO), medium- and high-earth-orbits (MEO and HEOs). When space systems are irradiated, some of the electrons are energetic enough to penetrate through satellite surfaces (e.g., ranges of 2.0 and 3.0 MeV electrons inside Aluminum are 4.53 and 6.92 mm, respectively), stop, and bury themselves inside the dielectric materials of electronic parts on board. During major MeV electron events when electron intensities across the outer belt are greatly enhanced with sustained high levels, these buried electrons accumulate faster than they can dissipate, and thus build up high electric fields (a process called "charging", with the potential differences reaching as high as multiple kilovolts), until eventually sudden intense breakdowns occur which result discharge arcs that may cause catastrophic failure to individual electronics or to the satellite as a whole.

Accordingly, forecasting MeV electron events have become more important in recent years given the reliance on various satellite technologies and space infrastructures. One conventional method in forecasting MeV electron events includes utilizing empirical models based on past measurements. Unfortunately the empirical model results in very crude results. Another conventional method is to use first-principles models that are driven by the dynamic global distributions of various input parameters, e.g., electrons with energies less than 1 MeV and related wave intensities, to forecast MeV electron events; however, due to the lack of adequate measurement coverage, these theoretical models still fall short of making reliable prediction with high time resolutions. Some conventional systems have utilized machine learning (ML) to forecast MeV electron events in GEO because continuous in situ measurement of MeV electrons are available along with a large volume of past data. However, intensification events of ultra-relativistic electrons (with energies greater than or equal to 2 MeV) not only occur in GEO but across the whole outer belt region, in particular, in the heart region of four Earth radii where navigation satellites reside. In this vast space, unfortunately, in-situ measurements of ultra-relativistic electrons are not routinely available, and thus the conventional ML model cannot be simply applied to make forecasts.

SUMMARY

Accordingly, a need has arisen to generate a model that reliably forecasts the intensifications of ultra-relativistic electrons (hereinafter called ultra-relativistic electron events or MeV electron events). Our solution is an ML model higher electron events based on lower-energy electrons and/or solar wind data. In some embodiments, a plurality of ML models is generated based on various inputs, e.g., solar wind data, measurements of low-energy electrons (less than 2 MeV) in low-Earth-orbits (LEO), etc., window size for the input selection, the models are trained and validated by observed (e.g., measured) ultra-relativistic electron (greater than or equal to 2 MeV) distributions in the past, and the known outputs are nowcasts and forecasts of ultra-relativistic electron distributions in the future. A subset of ML models from the plurality of ML models can be selected to form an ensemble group. An ensemble ML model can be generated from the group to make ensemble forecasts with error bars, e.g., statistical mean of each ML model of the ensemble group at each L-shell.

A system may include one or more transmitters configured to transmit measured low-energy electrons that are less than or equal to 1.5 MeV, wherein the measured low-energy electrons include at least a first and a second set of data. The system may further include a receiver configured to receive the measured low-energy electrons from the one or more transmitters, and wherein the receiver is further configured to receive solar wind data as a third set of data, and wherein the receiver is further configured to receive data associated with observation of higher-electron events with greater than or equal to 2 MeV. The system also includes a processor configured to generate a plurality of machine learning (ML) models based on (1) selection of one or more ML algorithms (e.g., linear regression, feedforward neural networks (FNN), long-short-term memory (LSTM), and convolutional neural network (CNN)), (2) selection of input data from at least two or more of the first set of data, the second set of data, and the third set of data, (3) the data associated with the observation of higher-electron events with greater than or equal to 2 MeV as its output, and (4) selection of a number of window size. It is appreciated that each generated ML model of the plurality of ML models is different from one another generated ML model of the plurality of ML models based on the selection of ML algorithm, the selection of input data, and the selection of window size. Moreover, it is appreciated that the processor is further configured to select a subset of ML models from the plurality of ML models to generate an ensemble ML model.

In some embodiments, the processor is further configured to apply new data input to the generated ensemble ML model to predict higher electron events of greater than or equal to 2 MeV. According to some embodiments, the measured low-energy electrons includes a third set of data, and wherein the first set of data includes electron count rates of greater than 100 keV, the second set of data includes electron count rates of greater than 300 keV, and the third set of data includes electron count rates of greater than 1000 keV. In some embodiments, the receiver is further configured to receive a derivative of the measured low-energy electrons, and wherein the processor is further configured to make a selection of input data including the derivative of the measured low-energy electrons. It is appreciated that the solar wind data includes data associated with one or more of solar wind velocity and solar wind density.

It is appreciated that in some embodiments the plurality of ML models is generated based on a combination of at least two or more different ML algorithms. In some embodiments, the plurality of ML models is generated based on a combination of at least two or more input data. It is further appreciated that the plurality of ML models may be generated based on a combination of at least two or more window sizes.

In some embodiments the system includes a receiver configured to receive a measured low-energy electrons from one or more transmitters that are less than or equal to 1.5 MeV, wherein the measured low-energy electrons include at least a first and a second set of data, and wherein the receiver is further configured to receive solar wind data as a third set of data, and wherein the receiver is further configured to receive data associated with observation of higher-electron events with greater than or equal to 2 MeV. The system may further include a processor configured to generate a plurality of machine learning (ML) models based on: (1) selection of one or more ML algorithms (e.g., linear regression, feedforward neural networks (FNN), long-short-term memory (LSTM), and convolutional neural network (CNN)), (2) selection of input data from at least two or more of the first set of data, the second set of data, and the third set of data, (3) the data associated with the observation of higher-electron events with greater than or equal to 2 MeV as its output, and (4) selection of a number of window size. It is appreciated that each generated ML model of the plurality of ML models is different from one another generated ML model of the plurality of ML models based on the selection of ML algorithm, the selection of input data, and the selection of window size. Moreover, it is appreciated that the processor is further configured to select a subset of ML models from the plurality of ML models to generate an ensemble ML model.

In some embodiments, the processor is further configured to apply new data input to the generated ensemble ML model to predict higher electron events of greater than or equal to 2 MeV. It is appreciated that in some embodiments the measured low-energy electrons include a third set of data, and wherein the first set of data includes electron count rates of greater than 100 keV, the second set of data includes electron count rates of greater than 300 keV, and the third set of data includes electron count rates of greater than 1000 keV. According to some embodiments, the receiver is further configured to receive a derivative of the measured low-energy electrons, and wherein the processor is further configured to make a selection of input data including the derivative of the measured low-energy electrons. It is appreciated that in some embodiments the solar wind data includes data associated with one or more of solar wind velocity and solar wind density.

In some embodiments, a method includes receiving a plurality of data sets, wherein the plurality of data sets includes measured low-energy electrons that are less than or equal to 1.5 MeV, and wherein the plurality of data sets further includes data associated with solar wind, e.g., solar wind velocity and solar wind density. The method further includes receiving measured data associated with higher electron events of greater than or equal to 2 MeV. In some embodiments, the method also includes in response to a selection of at least two data sets from the plurality of data sets, and further in response to a selection of one or more machine learning (ML) algorithms from a plurality of ML algorithms (e.g., linear regression, feedforward neural networks (FNN), long-short-term memory (LSTM), and convolutional neural network (CNN)), and further in response to a selection of a number of window size, generating a plurality of ML models based on the selections as an input and the measured data associated with higher electron events of greater than or equal to 2 MeV as its output.

The method in some embodiments further includes forming an ensemble of ML models in response to a selection of a subset of ML models from the plurality of ML models. The method further includes generating an ensemble ML model based on the ensemble of ML models, wherein the ensemble ML model is a statistical means of the subset of ML models at each measured L-shell, wherein L-shell is the equatorial distance to earth.

In some embodiments, the method further includes generating an ensemble ML model based on a selection of a subset of ML models of the plurality of ML models. According to some embodiments, the method includes receiving new data sets that include a selection from the measured low-energy electrons that are less than or equal to 1.5 MeV and the data associated with solar wind; and applying the new data sets as input to the ensemble ML model to predict higher electron events of greater than or equal to 2 MeV.

In some embodiments, the measured low-energy electrons include data sets for electron count rates of greater than 100 keV, electron count rates of greater than 300 keV, and electron count rates of greater than 1000 keV.

These and other features and aspects of the concepts described herein may be better understood with reference to the following drawings, description, and appended claims.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A depicts an example of a diagram of a hardware-based system configured to receive data inputs and to generate one or more ML model(s) that can subsequent to the training stage be used to forecast high electron events according to one aspect of the present embodiments.

FIG. 2M shows 1-day ensemble forecasting results for higher electron events at 2 MeV electron fluxes over individual L-shells, according to some nonlimiting examples.

FIG. 4 shows a flow diagram for generating an ensemble ML model, according to some nonlimiting embodiments.

DETAILED DESCRIPTION

Figure 1B:
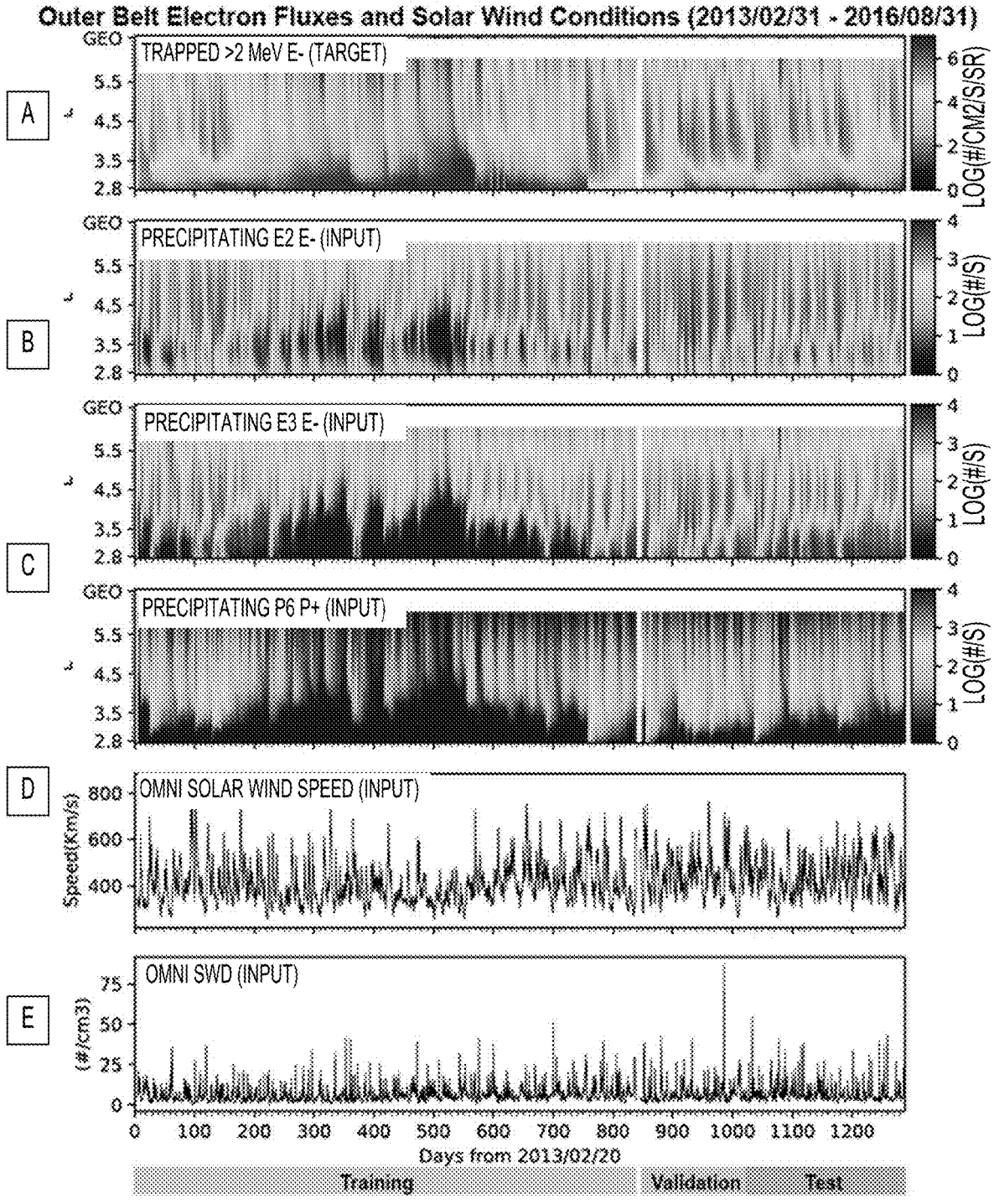
FIG. 1B shows measured input data such as low-energy electron measurements and solar wind data, according to one aspect of the present embodiments is shown, as well as ultra-relativistic electron distributions (i.e., target data) measured in the past.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

It is appreciated that the intensifications of electrons traveling at greater than 0.98 of the speed of light—also known as ultra-relativistic electrons with energies greater than or equal to 2 MeV—cause higher electron events (i.e., energies greater than or equal to 2 MeV). The embodiments utilize one or more measurements of precipitating low-energy electrons (i.e., energies such as 100 keV, 300 keV, 1 MeV, etc.) from satellites (for example operating in low earth orbit (LEO)), ultra-relativistic electron measurements in geosynchronous orbit (GEO), etc., and/or other measurements, e.g., solar wind velocity, solar wind densities, etc., (as measured by solar wind monitors at Lagrangian 1 point of Sun-Earth, in one nonlimiting example) as inputs to one or more ML algorithms, e.g., linear regression, feedforward neural networks (FNN), long-short-term memory (LSTM), convolutional neural network (CNN), etc. It is appreciated that in some embodiments, a transmitter may transmit the measurements associated with precipitating low-energy electrons, solar wind associated information, etc., to a processor for further processing. The one or more ML algorithms use the input data as training data to generate a model in order to forecast higher MeV electron events (i.e., ultra-relativistic electrons with greater than or equal to 2 MeV). In other words, a new approach explores the use of precipitating low-energy electrons observed in LEO, MeV electrons in GEO, etc., and/or solar wind velocity and density at Lagrangian 1, to forecast higher electron events, i.e. greater than or equal to 2 MeV. The low-energy electrons may be defines as substantially less than 2 MeV, e.g., approximately 1 MeV, 100 keV, 300 keV, etc. Throughout this application low-energy electrons are considered to be at or below ~1.5 MeV.

In some embodiments, a number of different (or the same) ML algorithms with different inputs (or combination thereof) and a number of different window sizes (i.e., a number of periods such as four 5 hour periods as an example) are used to generate different ML models. Ensemble methodology (i.e., ensemble of various models) may be used to generate a broad sample of possible future states of a dynamic system based on slightly different initial conditions (e.g., input, window size, etc.) and/or different forecast models (e.g., different ML algorithms) to forecast higher electron events. The output from the ML algorithms with different data inputs, size, etc., can be combined and analyzed to identify trends and uncertainty ranges.

Accordingly, an ensemble of ML models generated can be used in order to generate a model that reliably predicts (e.g., 1-day forecast, 2-day forecast, etc.) ultra-relativistic electrons (i.e., higher electron events) based on lower electron events measured by a combination of satellites operating in LEO, GEO, and/or solar wind velocity at Lagrangian 1 point, etc. It is appreciated that while the ML model generated based on the lower electron events and/or solar wind velocity successfully forecast higher electron events, the ensemble methodology further improves the predictability of the higher electron events across the outer radiation belt.

It is appreciated that generation of the forecasting model, as described above, can be updated over time using additional data input. For example, the models may be updated based on receiving data, e.g., electron fluxes at given electron energies, etc., received from global positioning (GPS) satellites. In other words, the ML models can be changed and updated over time and on-the-fly.

FIG. 1A depicts an example of a diagram of a hardware-based system 100A and 100B configured to receive data inputs and to generate one or more ML model(s) that can subsequent to the training stage be used to forecast high electron events according to one aspect of the present embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be coupled by one or more networks. When the software instructions are executed, the one or more hardware components become a special purposed hardware component for generating an ML model or applying the generated ML model to forecast high electron events.

During a training/on-the-fly-learning phase 100A, a processor 110, e.g., a central processing unit (CPU), an application specific integrated circuit (ASIC), a graphics pipeline unit (GPU), an ML specific processor, etc., may receive training data as its input. For example, the processor 110 may receive low-energy electron data 102, e.g., 100 keV, 300 keV, 1 MeV, etc. It is appreciated that low-energy electron is generally referred to as an electron with less than 2 MeV. Moreover, the processor 110 may receive solar wind data 104, e.g., solar wind velocity, solar wind density, etc. In some embodiments, the processor 110 also receives the ML algorithm 106, e.g., linear regression, FNN, LSTM, CNN, etc. The input data (i.e., solar wind data 104 and/or low-energy electron data 102) is used during the training stage of the specific ML algorithm 106, optimized by comparing to the target data, to generate an ML model 112. It is appreciated that the embodiments are described with respect to receiving both the low-energy electron data 102 and the solar wind data 104 for illustrative purposes, but should not be construed as limiting the scope of the embodiments. For example, in some embodiments only the solar wind data 104 may be used, or the low-energy electron data 102 may be used, or alternatively other types of data may be used, e.g., data from a GPS satellite.

It is appreciated that in some embodiments, the low-energy electron data 102 may be measured by one NOAA Polar Operational Environmental Satellite (POES) NOAA-15. In some embodiments, the solar wind data 104 may be an upstream solar wind conditions, e.g., solar wind velocity (SW), solar wind densities (SWD), temperature, etc., over the same time interval as the low-energy electron data 102. It is appreciated that the solar wind data 104 may be standardized by subtracting their mean values and dividing the results with the standard deviations.

In the described embodiments, three different channels, e.g., E2, E3, and P6, for low-energy electron measurements by POES are used. It is appreciated that the E2 channel measures electron counts having greater than 100 keV, E3 channel measures electron counts having greater than 300 keV, and P6 channel measures electron counts having greater than 1 MeV. It is appreciated that the channels and the electron energy levels described are for illustrative purposes and should not be construed as limiting the scope of the embodiments. For example, any number of channels, e.g., 2 channels or greater than 3 channels, with different electron energy levels, e.g., 600 keV, 500 keV, etc., may be used. It is appreciated that electron intensities refers to electron flux value (i.e., number of particles going through a given area within a given time interval).

It is appreciated that the low-energy electron data 102 and/or the solar wind data 104 are binned in certain time increments, e.g., 5 hour increments (5 hr time bin), at various equatorial distances (i.e., L-shells).

The ML algorithm 106 may be based on linear regression models in order to optimize linear relationship between input parameters and targets. In contrast, ML algorithm 106 may be based on FNN that uses layers of neurons to process inputs with linear transformations followed by nonlinear activation functions to optimize outputs. ML algorithm 106 may be based on LSTM networks that includes connected memory cells that learn the sequential and temporal dynamics from the previous time steps, e.g., previous 10 hours as an example, to make predictions. The ML algorithm 106 may be based on CNN that relies on a convolution kernel to filter the data and explore the local patterns inside.

For model development, the input data may be split into two stages, e.g., training and post training. At the end of the training stage, an ML model is generated that can be used to forecast higher electron events, e.g., during testing and validation stage. In the described embodiments, the training stage is approximately 65% (~835 days) while validation is approximately 14% (175 days) testing is approximately 21% (267 days) for the collected data.

It is appreciated that the ML model(s) is trained for each individual L-shell between 2.8 and 6 as well as at GEO (6.6) in the outer belt region, with the optimization goal of reducing the root-mean-square error between the target values y (electron fluxes in logarithm) and predicted values f.

It is appreciated that once the ML model(s) 112 is generated it may be fed into a processor 120 as one of its input, during the validation/testing/operation 100B stage. The processor 120 may also receive the low-energy electron data 102 and/or solar wind data 104, as described above. It is appreciated that the processor 120 may be similar to processor 110 and may in fact be the same. Different parameter combinations and temporal window sizes are tested for model inputs. The processor 120 may process the input data based on the ML model 112 and outputs a result to forecast high electron events forecast 124.

It is appreciated that the model performance may be gauged by Performance Efficiency (PE), which quantifies the accuracy of predictions by comparing to the variance of the target. Naming y and f both with size M, PE is defined as $$PE = 1 - \frac{\sum_{j=1}^{M}(y_j - f_j)^2}{\sum_{j=1}^{M}(y_j - \bar{y})^2},$$

where $\bar{y}$ is the mean of y. PE does not have a lower bound, and its perfect score is 1.0, meaning all predicted value perfectly match observed data, or that f=y.

Referring now to FIG. 1B, measured input data, e.g., low-energy electron measurements, solar wind data, etc., according to one aspect of the present embodiments is shown. It is appreciated that FIG. 1B shows data collected for 1289-days.

Panel A illustrates ultra-relativistic electron flux distributions from the in-situ observations made by the Relativistic Electron-proton Telescope aboard one Van Allen Probe spacecraft (RBSP-a) at L≤6, and by the Energy Spectrometer for Particles (ESP) instrument carried by one Los Alamos National Laboratory (LANL) GEO satellite LANL-01A at L=6.6. The ESP instrument measures the fluxes of relativistic electrons between 0.7 and 10 MeV. As illustrated integral fluxes of greater than or equal to 2 MeV electrons are the target data set that is a function of L-shell over a 1289-day interval. These greater than or equal to 2 MeV electron data are used for model training, validation, and test.

Panels B, C, and D illustrate the count rates (logarithmically) of precipitating electrons (low-energy electrons) measize may be changed to generate a different model for each selection. For example, the data input may be selected and be a combination of E2, E3, E6, SW, SWD, dE2 (temporal derivative of E2), E246 (E2 measured at L-shell 4.6 which may be desirable due to high cross L-sell correlation and positive effects on forecast), etc., and the window size may be selected from 4 (i.e., 20 hours in this example) or 16 (i.e., 80 hours in this example). A number of selected combinations may generate different models as illustrated by index 1-8 of Table 1 below. It is appreciated that a similar process may be performed for other ML algorithms 106, e.g., FNN (in this example composed of two hidden layers as the first one has 64 neurons and the second has 32 neurons and the neurons use Exponential Linear Unit (ELU) as the activation function), LSTM (in this examples includes 128 memory cells), and CNN (in this example contains two convolutional layers, the first contains 64 kernels and the second contains 32 kernels and the kernels use Rectified Linear Unit (relu) as an activation function), as illustrated by index 9-32 of Table 1 below. It is appreciated that the particular data inputs, window size, and ML algorithm described are for illustrative purposes and should not be construed as limiting the scope of the embodiments.

TABLE 1

| Index | Models | Window size | Input Parameters | PE train | PE validation | PE test | PE val + test | PE all | PE GEO val + test |
|---|---|---|---|---|---|---|---|---|---|
| 1 | LinearReg | 4 | E2 + E3 + P6 + SW | 0.712 | 0.108 | 0.454 | 0.414 | 0.707 | 0.621 |
| 2 | LinearReg | 16 | E2 + E3 + P6 + SW | 0.742 | 0.194 | 0.509 | 0.47 | 0.736 | 0.623 |
| 3 | LinearReg | 4 | E2 + E3 + P6 + SW + dE2 | 0.714 | 0.112 | 0.461 | 0.42 | 0.709 | 0.622 |
| 4 | LinearReg | 16 | E2 + E3 + P6 + SW + dE2 | 0.747 | 0.197 | 0.523 | 0.479 | 0.741 | 0.625 |
| 5 | LinearReg | 4 | E2 + E3 + P6 + SW + dE2 + E246 | 0.736 | 0.188 | 0.486 | 0.456 | 0.731 | 0.622 |
| 6 | LinearReg | 16 | E2 + E3 + P6 + SW + dE2 + E246 | 0.763 | 0.255 | 0.548 | 0.509 | 0.757 | 0.625 |
| 7 | LinearReg | 4 | E2 + E3 + P6 + SW + SWD + dE2 + E246 | 0.741 | 0.193 | 0.502 | 0.466 | 0.736 | 0.627 |
| 8 | LinearReg | 16 | E2 + E3 + P6 + SW + SWD + dE2 + E246 | 0.77 | 0.266 | 0.568 | 0.523 | 0.764 | 0.629 |
| 9 | FNN-64-32-elu | 4 | E2 + E3 + P6 + SW | 0.686 | 0.202 | 0.463 | 0.426 | 0.69 | 0.631 |
| 10 | FNN-64-32-elu | 16 | E2 + E3 + P6 + SW | 0.699 | 0.331 | 0.459 | 0.46 | 0.704 | 0.62 |
| 11 | FNN-64-32-elu | 4 | E2 + E3 + P6 + SW + dE2 | 0.644 | 0.216 | 0.403 | 0.395 | 0.658 | 0.63 |
| 12 | FNN-64-32-elu | 16 | E2 + E3 + P6 + SW + dE2 | 0.716 | 0.319 | 0.511 | 0.488 | 0.72 | 0.603 |
| 13 | FNN-64-32-elu | 4 | E2 + E3 + P6 + SW + dE2 + E246 | 0.766 | 0.404 | 0.566 | 0.553 | 0.765 | 0.63 |
| 14 | FNN-64-32-elu | 16 | E2 + E3 + P6 + SW + dE2 + E246 | 0.704 | 0.2 | 0.441 | 0.408 | 0.699 | 0.624 |
| 15 | FNN-64-32-elu | 4 | E2 + E3 + P6 + SW + SWD + dE2 + E246 | 0.713 | 0.266 | 0.456 | 0.446 | 0.713 | 0.646 |
| 16 | FNN-64-32-elu | 16 | E2 + E3 + P6 + SW + SWD + dE2 + E246 | 0.715 | 0.195 | 0.392 | 0.384 | 0.703 | 0.621 |
| 17 | LSTM-128 | 4 | E2 + E3 + P6 + SW | 0.662 | 0.208 | 0.445 | 0.414 | 0.673 | 0.527 |
| 18 | LSTM-128 | 16 | E2 + E3 + P6 + SW | 0.75 | 0.366 | 0.537 | 0.521 | 0.747 | 0.581 |
| 19 | LSTM-128 | 4 | E2 + E3 + P6 + SW + dE2 | 0.665 | 0.198 | 0.44 | 0.41 | 0.675 | 0.538 |
| 20 | LSTM-128 | 16 | E2 + E3 + P6 + SW + dE2 | 0.74 | 0.287 | 0.526 | 0.489 | 0.737 | 0.588 |
| 21 | LSTM-128 | 4 | E2 + E3 + P6 + SW + dE2 + E246 | 0.7 | 0.282 | 0.472 | 0.459 | 0.706 | 0.535 |
| 22 | LSTM-128 | 16 | E2 + E3 + P6 + SW + dE2 + E246 | 0.781 | 0.401 | 0.545 | 0.537 | 0.771 | 0.6 |
| 23 | LSTM-128 | 4 | E2 + E3 + P6 + SW + SWD + dE2 + E246 | 0.671 | 0.14 | 0.387 | 0.365 | 0.674 | 0.648 |
| 24 | LSTM-128 | 16 | E2 + E3 + P6 + SW + SWD + dE2 + E246 | 0.799 | 0.348 | 0.507 | 0.499 | 0.777 | 0.571 |
| 25 | Conv-64-32-relu | 4 | E2 + E3 + P6 + SW | 0.702 | 0.289 | 0.462 | 0.453 | 0.705 | 0.593 |
| 26 | Conv-64-32-relu | 16 | E2 + E3 + P6 + SW | -0.178 | -3.765 | -2.17 | -2.333 | -0.341 | -0.002 |
| 27 | Conv-64-32-relu | 4 | E2 + E3 + P6 + SW + dE2 | 0.71 | 0.292 | 0.477 | 0.462 | 0.711 | 0.596 |
| 28 | Conv-64-32-relu | 16 | E2 + E3 + P6 + SW + dE2 | 0.186 | -2.251 | -1.138 | -1.268 | 0.078 | -0.081 |
| 29 | Conv-64-32-relu | 4 | E2 + E3 + P6 + SW + dE2 + E246 | 0.719 | 0.324 | 0.48 | 0.479 | 0.722 | 0.598 |
| 30 | Conv-64-32-relu | 16 | E2 + E3 + P6 + SW + dE2 + E246 | 0.11 | -2.382 | -1.334 | -1.398 | 0.006 | -0.168 |
| 31 | Conv-64-32-relu | 4 | E2 + E3 + P6 + SW + SWD + dE2 + E246 | 0.749 | 0.285 | 0.497 | 0.477 | 0.742 | 0.566 |
| 32 | Conv-64-32-relu | 16 | E2 + E3 + P6 + SW + SWD + dE2 + E246 | 0.065 | -2.861 | -1.636 | -1.733 | -0.08 | 0.074 |
| 33 | Ensemble: models 8 + 13 + 22 + 29 | | | 0.782 | 0.393 | 0.625 | 0.612 | 0.783 | 0.677 | sured by NOAA-15 in LEO, for E2, E3, and P6 channels, respectively. Panel E illustrates the solar wind speeds measured upstream of the magnetosphere from the OMNI data set while panel F illustrates the solar wind densities.

As discussed above, the ML algorithm 106, the data inputs (i.e. low-energy electron data 102 and/or solar wind data 104), and the size of the input may vary, e.g., number of certain time of periods (as discussed above). For example, linear regression as an ML algorithm 106 may be selected. For the selected ML algorithm 106 the data input and the Each generated model, after the training stage, may be tested and validated. Each model may be evaluated based on the performance efficiency, as described above, for illustrative purposes. It is appreciated that other methodology used to evaluate the performance may also be implemented, and the particular performance efficiency that has been described herein for illustrative purposes should not be construed as limiting the scope of the embodiments. The performance efficiency during the training stage, the validation stage, and the testing stage may be determined, as shown in columns 5-7 of Table 1. In some embodiments, the PE of the valuation and testing stage may be determine as well as the overall PE that includes the training stage and post training stage may be illustrated as shown in columns 8-9 of Table 1. In some embodiments, the PE for the validation and testing stage at GEO is also determined, as shown in column 10 of Table 1. It is appreciated that Table 1 illustrates the input data, model and PE for forecasting higher electron events (e.g., greater than 2 MeV) for a 1-day (25 hr) period, for illustration purposes.

It is appreciated that an ensemble methodology may be used to generate a model that almost outperforms each model individually and at various L-shells. In this illustrative example, the top generated ML model performer, after the training stage, from each category of ML algorithms are selected (i.e., top performance as determined by PE of validation and testing in column 8) and underlined and in bold font for convenience. All the selected models may be appreciated that the use of median is for illustrative purposes and should not be construed as limiting the scope of the embodiments. For example, an average may be used or alternatively other statistical operations may be used. It is further appreciated that the ensemble model can not only be used to forecast higher electron events but it can also be used to predict the uncertainty in the model, i.e., spread.

It is appreciated that a similar approach may be used to generate a plurality of ML models and to apply an ensemble methodology to generate an ML model that reliably forecasts higher electron events (i.e., greater than 2 MeV) for a 2-day (50 hour), as illustrated in Table 2 below. As illustrated, the ensemble may include different models based on the performance. For example, in Table 1 the ensemble includes models 8, 13, 22, and 29 while in Table 2 the ensemble includes the models 6, 13, 22, and 29 because one is forecasting for 1-day and the other is forecasting for 2-days.

TABLE 2

| Index | Models | Window size | Input Parameters | PE train | PE validation | PE test | PE val + test | PE all | PE GEO val + test |
|---|---|---|---|---|---|---|---|---|---|
| 1 | LinearReg | 4 | E2 + E3 + P6 + SW | 0.675 | 0.049 | 0.381 | 0.352 | 0.671 | 0.417 |
| 2 | LinearReg | 16 | E2 + E3 + P6 + SW | 0.702 | 0.12 | 0.433 | 0.4 | 0.696 | 0.421 |
| 3 | LinearReg | 4 | E2 + E3 + P6 + SW + dE2 | 0.678 | 0.055 | 0.39 | 0.358 | 0.674 | 0.422 |
| 4 | LinearReg | 16 | E2 + E3 + P6 + SW + dE2 | 0.707 | 0.127 | 0.444 | 0.409 | 0.701 | 0.427 |
| 5 | LinearReg | 4 | E2 + E3 + P6 + SW + dE2 + E246 | 0.701 | 0.128 | 0.411 | 0.391 | 0.695 | 0.422 |
| 6 | LinearReg | 16 | E2 + E3 + P6 + SW + dE2 + E246 | 0.727 | 0.189 | 0.468 | 0.438 | 0.72 | 0.428 |
| 7 | LinearReg | 4 | E2 + E3 + P6 + SW + SWD + dE2 + E246 | 0.703 | 0.141 | 0.42 | 0.399 | 0.697 | 0.429 |
| 8 | LinearReg | 16 | E2 + E3 + P6 + SW + SWD + dE2 + E246 | 0.606 | 0.45 | 0.414 | 0.431 | 0.577 | 0.431 |
| 9 | FNN-64-32-elu | 4 | E2 + E3 + P6 + SW | 0.658 | 0.14 | 0.407 | 0.372 | 0.661 | 0.428 |
| 10 | FNN-64-32-elu | 16 | E2 + E3 + P6 + SW | 0.669 | 0.251 | 0.392 | 0.393 | 0.671 | 0.403 |
| 11 | FNN-64-32-elu | 4 | E2 + E3 + P6 + SW + dE2 | 0.624 | 0.174 | 0.367 | 0.36 | 0.638 | 0.438 |
| 12 | FNN-64-32-elu | 16 | E2 + E3 + P6 + SW + dE2 | 0.686 | 0.236 | 0.436 | 0.416 | 0.687 | 0.419 |
| 13 | FNN-64-32-elu | 4 | E2 + E3 + P6 + SW + dE2 + E246 | 0.715 | 0.315 | 0.46 | 0.46 | 0.715 | 0.423 |
| 14 | FNN-64-32-elu | 16 | E2 + E3 + P6 + SW + dE2 + E246 | 0.67 | 0.109 | 0.373 | 0.34 | 0.664 | 0.433 |
| 15 | FNN-64-32-elu | 4 | E2 + E3 + P6 + SW + SWD + dE2 + E246 | 0.679 | 0.208 | 0.388 | 0.387 | 0.679 | 0.425 |
| 16 | FNN-64-32-elu | 16 | E2 + E3 + P6 + SW + SWD + dE2 + E246 | 0.681 | 0.133 | 0.322 | 0.322 | 0.668 | 0.385 |
| 17 | LSTM-128 | 4 | E2 + E3 + P6 + SW | 0.634 | 0.141 | 0.386 | 0.359 | 0.644 | 0.425 |
| 18 | LSTM-128 | 16 | E2 + E3 + P6 + SW | 0.711 | 0.29 | 0.461 | 0.451 | 0.708 | 0.384 |
| 19 | LSTM-128 | 4 | E2 + E3 + P6 + SW + dE2 | 0.64 | 0.139 | 0.387 | 0.36 | 0.649 | 0.42 |
| 20 | LSTM-128 | 16 | E2 + E3 + P6 + SW + dE2 | 0.706 | 0.238 | 0.453 | 0.428 | 0.701 | 0.36 |
| 21 | LSTM-128 | 4 | E2 + E3 + P6 + SW + dE2 + E246 | 0.668 | 0.193 | 0.394 | 0.385 | 0.672 | 0.366 |
| 22 | LSTM-128 | 16 | E2 + E3 + P6 + SW + dE2 + E246 | 0.739 | 0.307 | 0.457 | 0.456 | 0.729 | 0.39 |
| 23 | LSTM-128 | 4 | E2 + E3 + P6 + SW + SWD + dE2 + E246 | 0.644 | 0.11 | 0.342 | 0.328 | 0.647 | 0.418 |
| 24 | LSTM-128 | 16 | E2 + E3 + P6 + SW + SWD + dE2 + E246 | 0.743 | 0.252 | 0.405 | 0.407 | 0.723 | 0.335 |
| 25 | Conv-64-32-relu | 4 | E2 + E3 + P6 + SW | 0.676 | 0.227 | 0.396 | 0.394 | 0.676 | 0.403 |
| 26 | Conv-64-32-relu | 16 | E2 + E3 + P6 + SW | −0.115 | −3.656 | −2.088 | −2.227 | −0.283 | 0.048 |
| 27 | Conv-64-32-relu | 4 | E2 + E3 + P6 + SW + dE2 | 0.684 | 0.237 | 0.407 | 0.404 | 0.683 | 0.403 |
| 28 | Conv-64-32-relu | 16 | E2 + E3 + P6 + SW + dE2 | 0.209 | −2.242 | −1.139 | −1.254 | 0.094 | −1.397 |
| 29 | Conv-64-32-relu | 4 | E2 + E3 + P6 + SW + dE2 + E246 | 0.699 | 0.269 | 0.415 | 0.423 | 0.698 | 0.402 |
| 30 | Conv-64-32-relu | 16 | E2 + E3 + P6 + SW + dE2 + E246 | 0.181 | −2.22 | −1.24 | −1.287 | 0.07 | −0.105 |
| 31 | Conv-64-32-relu | 4 | E2 + E3 + P6 + SW + SWD + dE2 + E246 | 0.711 | 0.236 | 0.411 | 0.408 | 0.703 | 0.345 |
| 32 | Conv-64-32-relu | 16 | E2 + E3 + P6 + SW + SWD + dE2 + E246 | 0.125 | −2.594 | −1.53 | −1.588 | −0.02 | −0.328 |
| 33 | Ensemble: models 6 + 13 + 22 + 29 | | | 0.738 | 0.299 | 0.532 | 0.521 | 0.738 | 0.572 | used together in an ensemble model, as illustrated by index 33 that shows an ensemble group comprising models 8, 13, 22, and 29 for illustrative purposes. It is noteworthy that the top performers for each category may be different from the top performer of GEO, e.g., the top performer based on PE during validation and testing of FNN is different from its top performer based on PE of GEO during validation and testing. The ensemble model in some embodiments may be a mean of the selected models, e.g., at L=3.2 the ensemble model may be the mean of the predicted value for models 8, 13, 22, and 29. The ensemble model is determined at every L-shell, i.e., between 2.8 to GEO in this example. It is It is appreciated that a similar approach may be used to generate a plurality of ML models and to apply an ensemble methodology to generate an ML model that reliably forecasts higher electron events (i.e., equal to 2 MeV) for a 1-day (25 hour) and 2-day (50 hour), as illustrated in Tables 3 and 4 below. As illustrated, the ensemble may include different models based on the performance. For example, in Table 3 the ensemble includes models 8, 13, 24, and 29 while in Table 4 the ensemble includes the models 8, 9, 22, and 29 because one is forecasting for 1-day and the other is forecasting for 2-days.

TABLE 3

| Index | Models | Window size | Input Parameters | PE train | PE validation | PE test | PE val + test | PE all | PE GEO val + test |
|---|---|---|---|---|---|---|---|---|---|
| 1 | LinearReg | 4 | E2 + E3 + P6 + SW | 0.746 | 0.358 | 0.591 | 0.538 | 0.744 | 0.549 |
| 2 | LinearReg | 16 | E2 + E3 + P6 + SW | 0.769 | 0.427 | 0.628 | 0.583 | 0.768 | 0.561 |
| 3 | LinearReg | 4 | E2 + E3 + P6 + SW + dE2 | 0.748 | 0.363 | 0.596 | 0.543 | 0.747 | 0.554 |
| 4 | LinearReg | 16 | E2 + E3 + P6 + SW + dE2 | 0.773 | 0.432 | 0.637 | 0.59 | 0.772 | 0.568 |
| 5 | LinearReg | 4 | E2 + E3 + P6 + SW + dE2 + E246 | 0.761 | 0.383 | 0.594 | 0.55 | 0.755 | 0.553 |
| 6 | LinearReg | 16 | E2 + E3 + P6 + SW + dE2 + E246 | 0.781 | 0.44 | 0.632 | 0.59 | 0.776 | 0.568 |
| 7 | LinearReg | 4 | E2 + E3 + P6 + SW + SWD + dE2 + E246 | 0.768 | 0.385 | 0.595 | 0.551 | 0.759 | 0.555 |
| 8 | LinearReg | 16 | E2 + E3 + P6 + SW + SWD + dE2 + E246 | 0.792 | 0.45 | 0.645 | 0.6 | 0.784 | 0.566 |
| 9 | FNN-64-32-elu | 4 | E2 + E3 + P6 + SW | 0.763 | 0.396 | 0.582 | 0.548 | 0.756 | 0.535 |
| 10 | FNN-64-32-elu | 16 | E2 + E3 + P6 + SW | 0.721 | 0.298 | 0.481 | 0.451 | 0.71 | 0.471 |
| 11 | FNN-64-32-elu | 4 | E2 + E3 + P6 + SW + dE2 | 0.679 | 0.105 | 0.411 | 0.344 | 0.663 | 0.582 |
| 12 | FNN-64-32-elu | 16 | E2 + E3 + P6 + SW + dE2 | 0.7 | 0.238 | 0.476 | 0.426 | 0.693 | 0.505 |
| 13 | FNN-64-32-elu | 4 | E2 + E3 + P6 + SW + dE2 + E246 | 0.769 | 0.417 | 0.571 | 0.549 | 0.76 | 0.461 |
| 14 | FNN-64-32-elu | 16 | E2 + E3 + P6 + SW + dE2 + E246 | 0.727 | 0.249 | 0.455 | 0.422 | 0.708 | −0.735 |
| 15 | FNN-64-32-elu | 4 | E2 + E3 + P6 + SW + SWD + dE2 + E246 | 0.782 | 0.389 | 0.554 | 0.529 | 0.762 | 0.572 |
| 16 | FNN-64-32-elu | 16 | E2 + E3 + P6 + SW + SWD + dE2 + E246 | 0.73 | 0.168 | 0.418 | 0.369 | 0.692 | 0.487 |
| 17 | LSTM-128 | 4 | E2 + E3 + P6 + SW | 0.705 | 0.295 | 0.493 | 0.456 | 0.702 | 0.578 |
| 18 | LSTM-128 | 16 | E2 + E3 + P6 + SW | 0.751 | 0.387 | 0.539 | 0.518 | 0.742 | 0.539 |
| 19 | LSTM-128 | 4 | E2 + E3 + P6 + SW + dE2 | 0.713 | 0.295 | 0.503 | 0.463 | 0.708 | 0.551 |
| 20 | LSTM-128 | 16 | E2 + E3 + P6 + SW + dE2 | 0.744 | 0.36 | 0.519 | 0.496 | 0.731 | 0.509 |
| 21 | LSTM-128 | 4 | E2 + E3 + P6 + SW + dE2 + E246 | 0.757 | 0.362 | 0.539 | 0.511 | 0.746 | 0.577 |
| 22 | LSTM-128 | 16 | E2 + E3 + P6 + SW + dE2 + E246 | 0.791 | 0.423 | 0.525 | 0.525 | 0.764 | 0.516 |
| 23 | LSTM-128 | 4 | E2 + E3 + P6 + SW + SWD + dE2 + E246 | 0.782 | 0.395 | 0.556 | 0.533 | 0.764 | 0.539 |
| 24 | LSTM-128 | 16 | E2 + E3 + P6 + SW + SWD + dE2 + E246 | 0.836 | 0.453 | 0.551 | 0.549 | 0.795 | 0.509 |
| 25 | Conv-64-32-relu | 4 | E2 + E3 + P6 + SW | 0.762 | 0.309 | 0.548 | 0.496 | 0.744 | 0.437 |
| 26 | Conv-64-32-relu | 16 | E2 + E3 + P6 + SW | 0.602 | −0.596 | −0.096 | −0.186 | 0.494 | −0.549 |
| 27 | Conv-64-32-relu | 4 | E2 + E3 + P6 + SW + dE2 | 0.77 | 0.34 | 0.566 | 0.518 | 0.754 | 0.437 |
| 28 | Conv-64-32-relu | 16 | E2 + E3 + P6 + SW + dE2 | 0.637 | −0.467 | 0.031 | −0.057 | 0.545 | −0.49 |
| 29 | Conv-64-32-relu | 4 | E2 + E3 + P6 + SW + dE2 + E246 | 0.782 | 0.373 | 0.556 | 0.525 | 0.762 | 0.459 |
| 30 | Conv-64-32-relu | 16 | E2 + E3 + P6 + SW + dE2 + E246 | 0.638 | −0.422 | −0.05 | −0.09 | 0.533 | −0.898 |
| 31 | Conv-64-32-relu | 4 | E2 + E3 + P6 + SW + SWD + dE2 + E246 | 0.801 | 0.329 | 0.54 | 0.5 | 0.766 | 0.43 |
| 32 | Conv-64-32-relu | 16 | E2 + E3 + P6 + SW + SWD + dE2 + E246 | 0.67 | −0.537 | −0.086 | −0.17 | 0.529 | −0.631 |
| 33 | Ensemble: models 8 + 13 + 24 + 29 | | | 0.81 | 0.476 | 0.64 | 0.624 | 0.796 | 0.564 |

TABLE 4

| Index | Models | Window size | Input Parameters | PE train | PE validation | PE test | PE val + test | PE all | PE GEO val + test |
|---|---|---|---|---|---|---|---|---|---|
| 1 | LinearReg | 4 | E2 + E3 + P6 + SW | 0.701 | 0.288 | 0.5 | 0.461 | 0.7 | 0.186 |
| 2 | LinearReg | 16 | E2 + E3 + P6 + SW | 0.721 | 0.339 | 0.535 | 0.497 | 0.72 | 0.227 |
| 3 | LinearReg | 4 | E2 + E3 + P6 + SW + dE2 | 0.703 | 0.294 | 0.506 | 0.466 | 0.702 | 0.2 |
| 4 | LinearReg | 16 | E2 + E3 + P6 + SW + dE2 | 0.725 | 0.349 | 0.544 | 0.506 | 0.724 | 0.244 |
| 5 | LinearReg | 4 | E2 + E3 + P6 + SW + dE2 + E246 | 0.717 | 0.309 | 0.5 | 0.469 | 0.71 | 0.198 |
| 6 | LinearReg | 16 | E2 + E3 + P6 + SW + dE2 + E246 | 0.735 | 0.354 | 0.534 | 0.502 | 0.729 | 0.244 |
| 7 | LinearReg | 4 | E2 + E3 + P6 + SW + SWD + dE2 + E246 | 0.72 | 0.323 | 0.504 | 0.475 | 0.714 | 0.212 |
| 8 | LinearReg | 16 | E2 + E3 + P6 + SW + SWD + dE2 + E246 | 0.743 | 0.364 | 0.546 | 0.512 | 0.735 | 0.234 |
| 9 | FNN-64-32-elu | 4 | E2 + E3 + P6 + SW | 0.718 | 0.333 | 0.494 | 0.474 | 0.713 | 0.186 |
| 10 | FNN-64-32-elu | 16 | E2 + E3 + P6 + SW | 0.669 | 0.212 | 0.395 | 0.37 | 0.661 | 0.222 |
| 11 | FNN-64-32-elu | 4 | E2 + E3 + P6 + SW + dE2 | 0.642 | 0.041 | 0.348 | 0.286 | 0.627 | 0.258 |
| 12 | FNN-64-32-elu | 16 | E2 + E3 + P6 + SW + dE2 | 0.661 | 0.143 | 0.394 | 0.346 | 0.65 | −0.044 |
| 13 | FNN-64-32-elu | 4 | E2 + E3 + P6 + SW + dE2 + E246 | 0.718 | 0.332 | 0.472 | 0.461 | 0.71 | 0.105 |
| 14 | FNN-64-32-elu | 16 | E2 + E3 + P6 + SW + dE2 + E246 | 0.685 | 0.153 | 0.373 | 0.341 | 0.665 | −0.891 |
| 15 | FNN-64-32-elu | 4 | E2 + E3 + P6 + SW + SWD + dE2 + E246 | 0.725 | 0.306 | 0.446 | 0.436 | 0.706 | 0.081 |
| 16 | FNN-64-32-elu | 16 | E2 + E3 + P6 + SW + SWD + dE2 + E246 | 0.681 | 0.087 | 0.327 | 0.289 | 0.647 | 0.146 |
| 17 | LSTM-128 | 4 | E2 + E3 + P6 + SW | 0.667 | 0.197 | 0.407 | 0.373 | 0.66 | 0.191 |
| 18 | LSTM-128 | 16 | E2 + E3 + P6 + SW | 0.699 | 0.27 | 0.435 | 0.416 | 0.687 | 0.204 |
| 19 | LSTM-128 | 4 | E2 + E3 + P6 + SW + dE2 | 0.673 | 0.191 | 0.409 | 0.373 | 0.663 | 0.265 |
| 20 | LSTM-128 | 16 | E2 + E3 + P6 + SW + dE2 | 0.689 | 0.237 | 0.435 | 0.404 | 0.678 | 0.224 |
| 21 | LSTM-128 | 4 | E2 + E3 + P6 + SW + dE2 + E246 | 0.702 | 0.261 | 0.439 | 0.418 | 0.691 | 0.201 |
| 22 | LSTM-128 | 16 | E2 + E3 + P6 + SW + dE2 + E246 | 0.735 | 0.322 | 0.44 | 0.438 | 0.712 | 0.138 |
| 23 | LSTM-128 | 4 | E2 + E3 + P6 + SW + SWD + dE2 + E246 | 0.715 | 0.271 | 0.426 | 0.413 | 0.696 | 0.247 |
| 24 | LSTM-128 | 16 | E2 + E3 + P6 + SW + SWD + dE2 + E246 | 0.772 | 0.327 | 0.436 | 0.435 | 0.73 | 0.106 |
| 25 | Conv-64-32-relu | 4 | E2 + E3 + P6 + SW | 0.716 | 0.248 | 0.463 | 0.425 | 0.7 | 0.125 |
| 26 | Conv-64-32-relu | 16 | E2 + E3 + P6 + SW | 0.562 | −0.694 | −0.195 | −0.279 | 0.448 | −0.332 |
| 27 | Conv-64-32-relu | 4 | E2 + E3 + P6 + SW + dE2 | 0.72 | 0.236 | 0.451 | 0.413 | 0.699 | 0.105 |
| 28 | Conv-64-32-relu | 16 | E2 + E3 + P6 + SW + dE2 | 0.67 | −0.359 | 0.101 | 0.031 | 0.582 | −1.124 |
| 29 | Conv-64-32-relu | 4 | E2 + E3 + P6 + SW + dE2 + E246 | 0.74 | 0.294 | 0.456 | 0.439 | 0.717 | 0.102 |
| 30 | Conv-64-32-relu | 16 | E2 + E3 + P6 + SW + dE2 + E246 | 0.584 | −0.605 | −0.203 | −0.245 | 0.464 | −0.98 |
| 31 | Conv-64-32-relu | 4 | E2 + E3 + P6 + SW + SWD + dE2 + E246 | 0.745 | 0.219 | 0.425 | 0.393 | 0.708 | 0.076 |
| 32 | Conv-64-32-relu | 16 | E2 + E3 + P6 + SW + SWD + dE2 + E246 | 0.68 | −0.53 | −0.117 | −0.173 | 0.532 | −1.216 |
| 33 | Ensemble: models 8 + 13 + 24 + 29 | | | 0.743 | 0.361 | 0.543 | 0.521 | 0.736 | 0.186 |

Figure 2A:
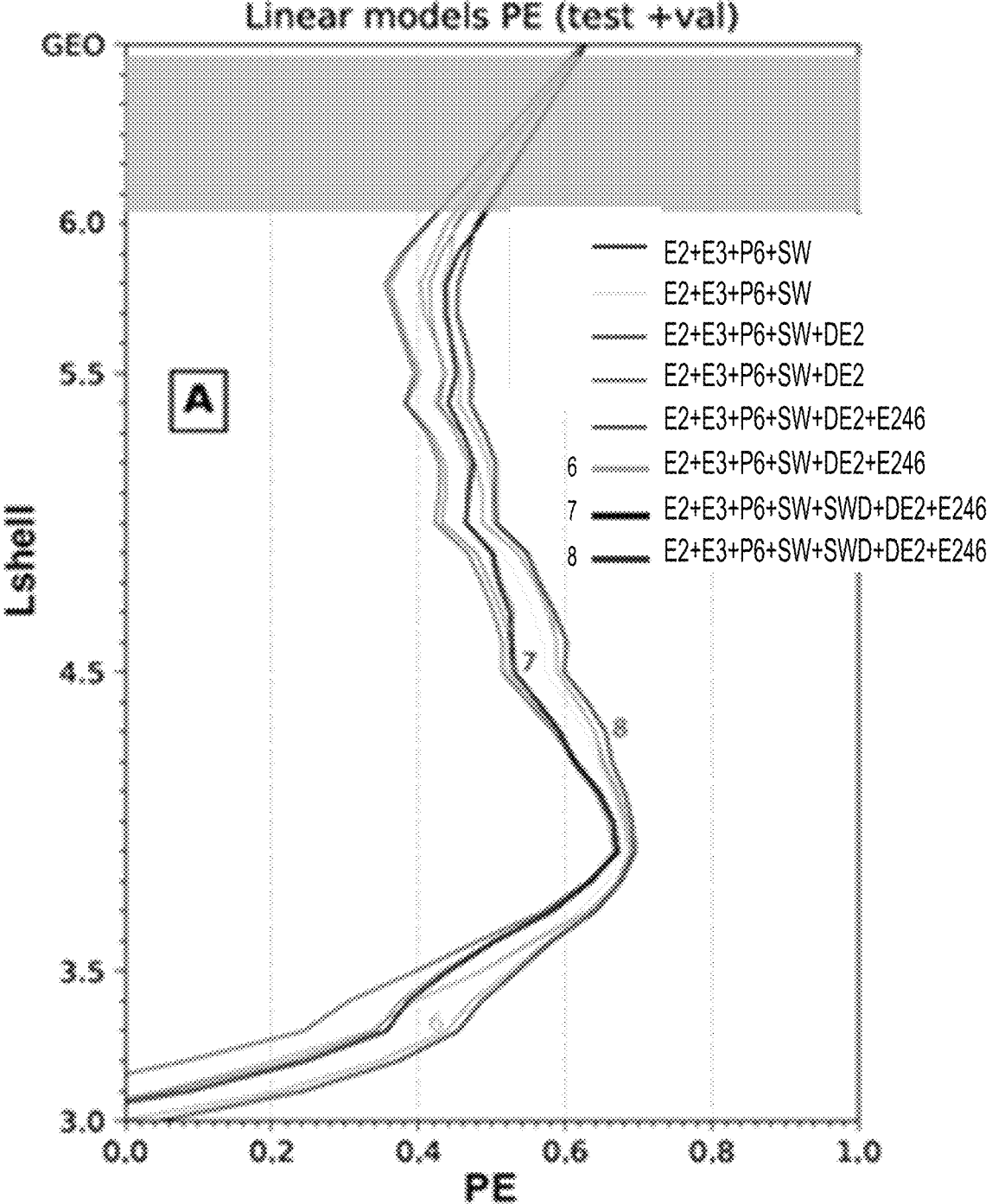
FIGS. 2A and 2A Cont. show PE values for the combined validation and test sets as a function of L-shell for linear and LSTM models of Table 1 for illustrative purposes, according to some nonlimiting examples.
Figure 2A:
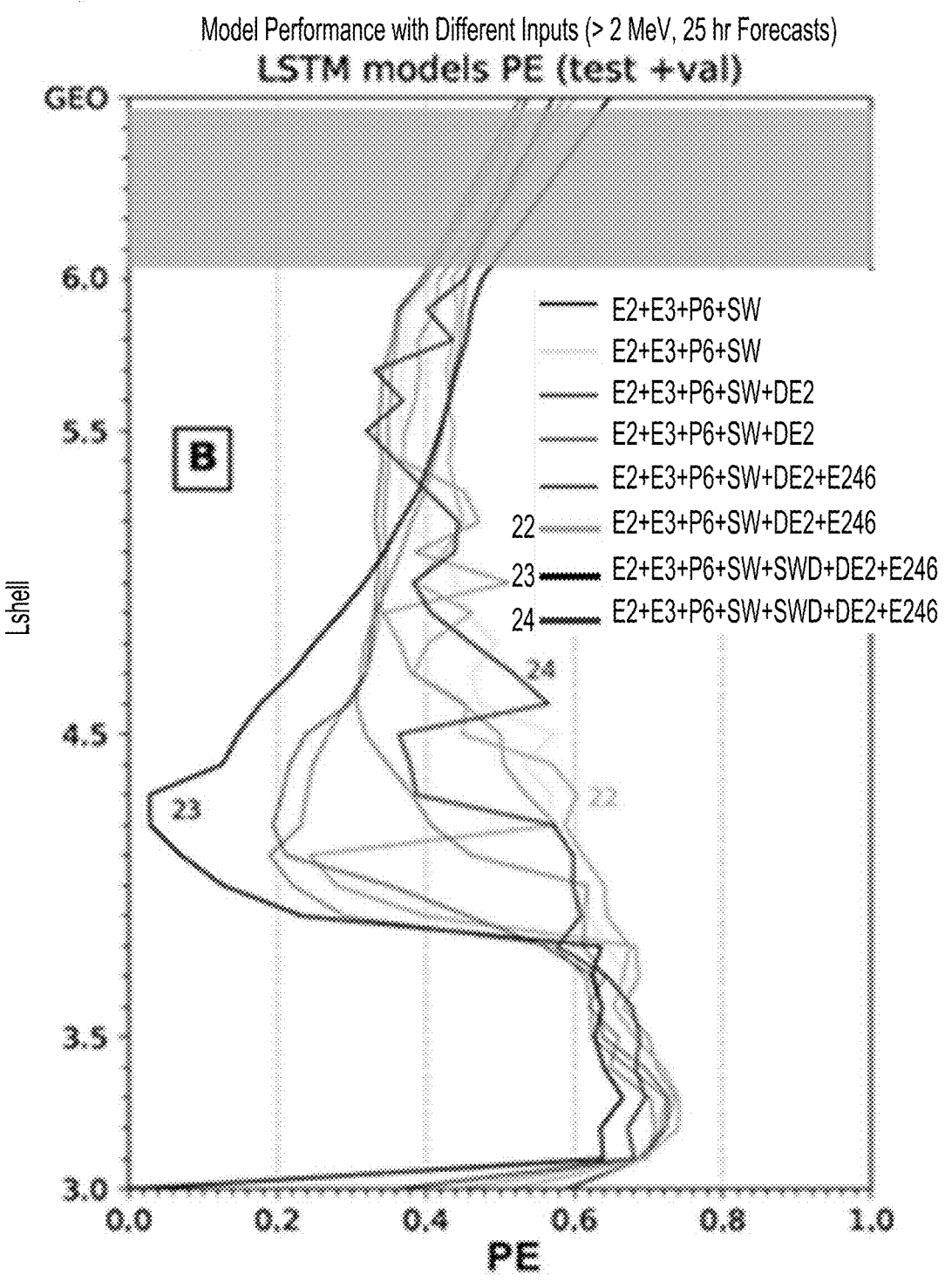

Referring now to FIGS. 2A and 2A Cont., PE values for the combined validation and test sets as a function of L-shell for linear and LSTM models of Table 1 are shown for illustrative purposes, according to some nonlimiting examples. The performance of the eight models for the linear regression (Panel A) can be compared to the eight models for the LSTM (Panel B). As illustrated the linear regression models behave similarly, while the LSTM models vary greatly with different input parameters and window sizes. Also noteworthy is that there are no data points on each PE curve inside the shaded L-shell range (i.e., 6.0<L<GEO).

The comparison of the performance of the linear regression models and the LSTM models illustrates the impact of feature selection, e.g., input data such as low-energy electron (E2, E3, P6, dE2, etc.), solar wind data (solar wind velocity, solar wind density, etc.), window size, etc., as a function of L-shells. In Panel A, the general trend can be observed for linear models that PE increases with the increasing number of input parameters and window sizes. All curves have similar shapes with the highest PE at L~4.0 (and decreasing in both directions, while PE values at GEO go above 0.6). Note that each PE curve has data points located at L-shells from 3.0 to 6.0 with an increment of 0.1 as well as at GEO. The high PE values at GEO can be explained by the inclusion of >2 MeV electron fluxes in-situ measured by LANL-01A satellite.

For illustration purposes three of the models are highlighted. In panel A, Models 6 and 8 have different input parameters but the same window size, while models 7 and 8 have the same input parameters but different window sizes (see Table 1). As illustrated model 8 has the highest PE with SWD included as one of its data inputs. In Panel B, LSTM models 23, 24, and 25 are highlighted for illustration purposes. Models 23-25 have different PE curves with large variations. Several LSTM models show a local minimum in PE with L-shell at ~4 and a plateau at L between 3.1-3.8. In addition, the inclusion of SWD to models 23 and 24 has decreased their respective PE at L≤6 in comparison to those of model 22 (also see Table 1). PE values can drop below zero at small L<3.0, particularly for the linear models, mainly due to the lack of training events. Therefore, hereinafter we confine our discussions on PE only for L≥3.0.

In order to determine performance, mean PE values of Table 1 may be determined. The mean values are averaged over all L-shells except for GEO for individual models. Based on the mean out-of-sample (post training stage) PE values, the models may be ranked from high to low. For instance, in the linear category, model 8 is the top performer with the highest mean PE of 0.523, followed by model 6 with a PE value of 0.509. For the top performer model 8, its out-of-sample PE at GEO is 0.629, also the highest in the category and thus in bold and underscored. Similarly, the top and second performers in other categories are picked out with their mean PE in bold font and underscored. In Table 1, mean PE values of the four top (second) performers are 0.523 (0.509) for linear, 0.553 (0.488) for FNN, 0.537 (0.521) for LSTM, and 0.479 (0.477) for CNN, while their PE values at GEO are 0.629 (0.625), 0.630 (0.603), 0.600 (0.581), and 0.598 (0.566), which are not necessarily the highest of each category. As illustrated, among the four top performers, only the linear model 8 has SWD in model inputs, while at GEO three out of the four models with the highest PE, i.e., models 8, 15 and 23, have SWD) included.

Similarly, in Table 2 for 2-day forecasts, mean out-of-sample PE values for the four top (second) performers are 0.438 (0.431), 0.460 (0.416), 0.456 (0.451), and 0.423

(0.408), while their PE at GEO are 0.428 (0.431), 0.423 (0.419), 0.390 (0.384), and 0.402 (0.345) which are often not the highest in the category. For 2-day forecasts, SWD are only needed for the top four performers, while at GEO the only exception is the linear model 8. Therefore, SWD is not necessary for model input except for 1-day linear forecasts at GEO.

Also, in both Tables 1 and 2, top FNN and LSTM models marginally outperform top linear models, suggesting the significance of nonlinear component for greater than 2 MeV electrons. Additionally, PE values at GEO are ~0.1 higher than the mean PE at L≤6 for 1-day forecasts, while for 2-day forecasts PE values are slightly lower at GEO.

Figure 2B:
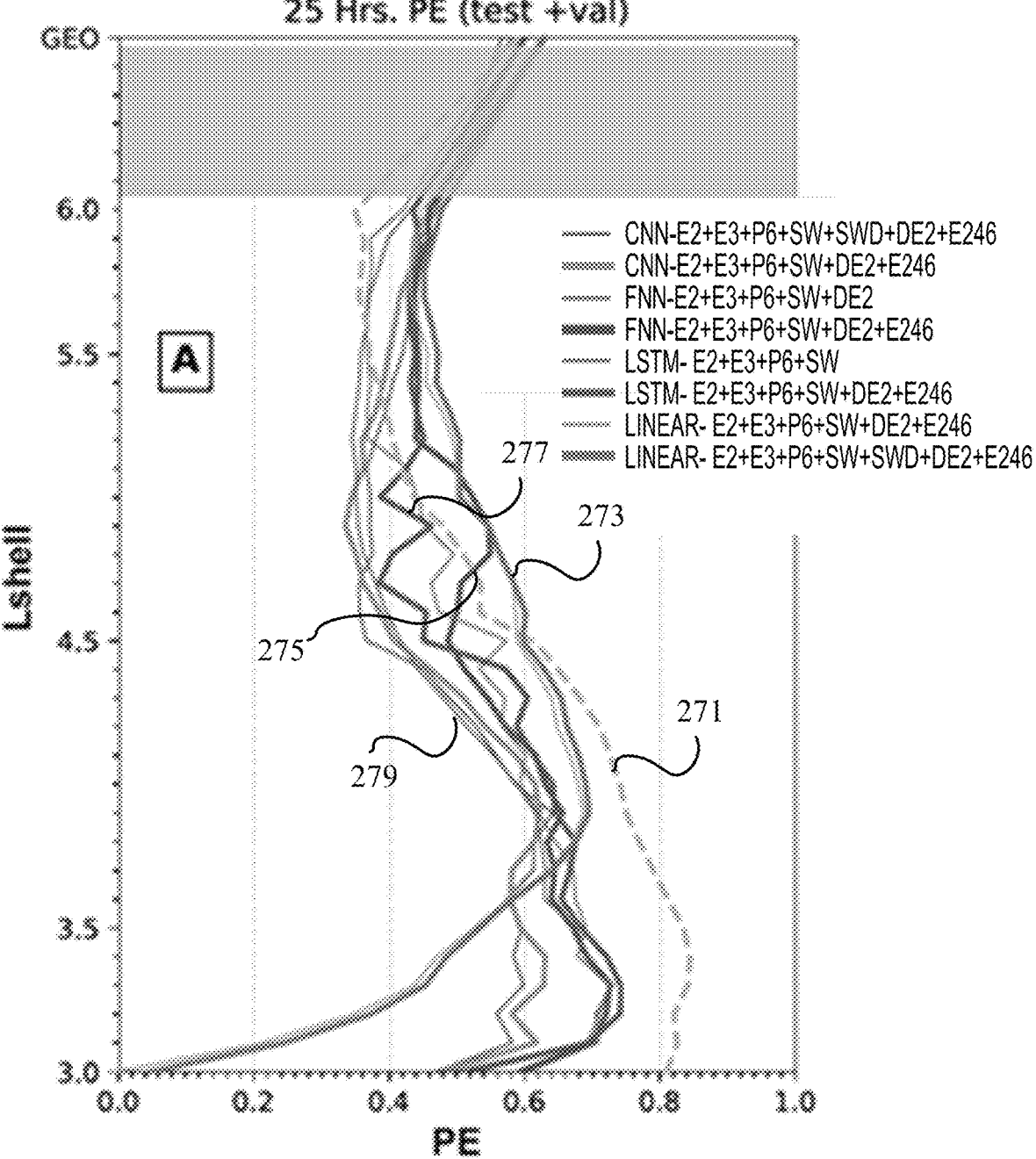
FIGS. 2B and 2B Cont. show model PE values for validation and test data for Tables 1-2 as a function of L-shell for the top two performers in each category forecasting greater than 2 MeV electrons, according to some nonlimiting examples.
Figure 2B:
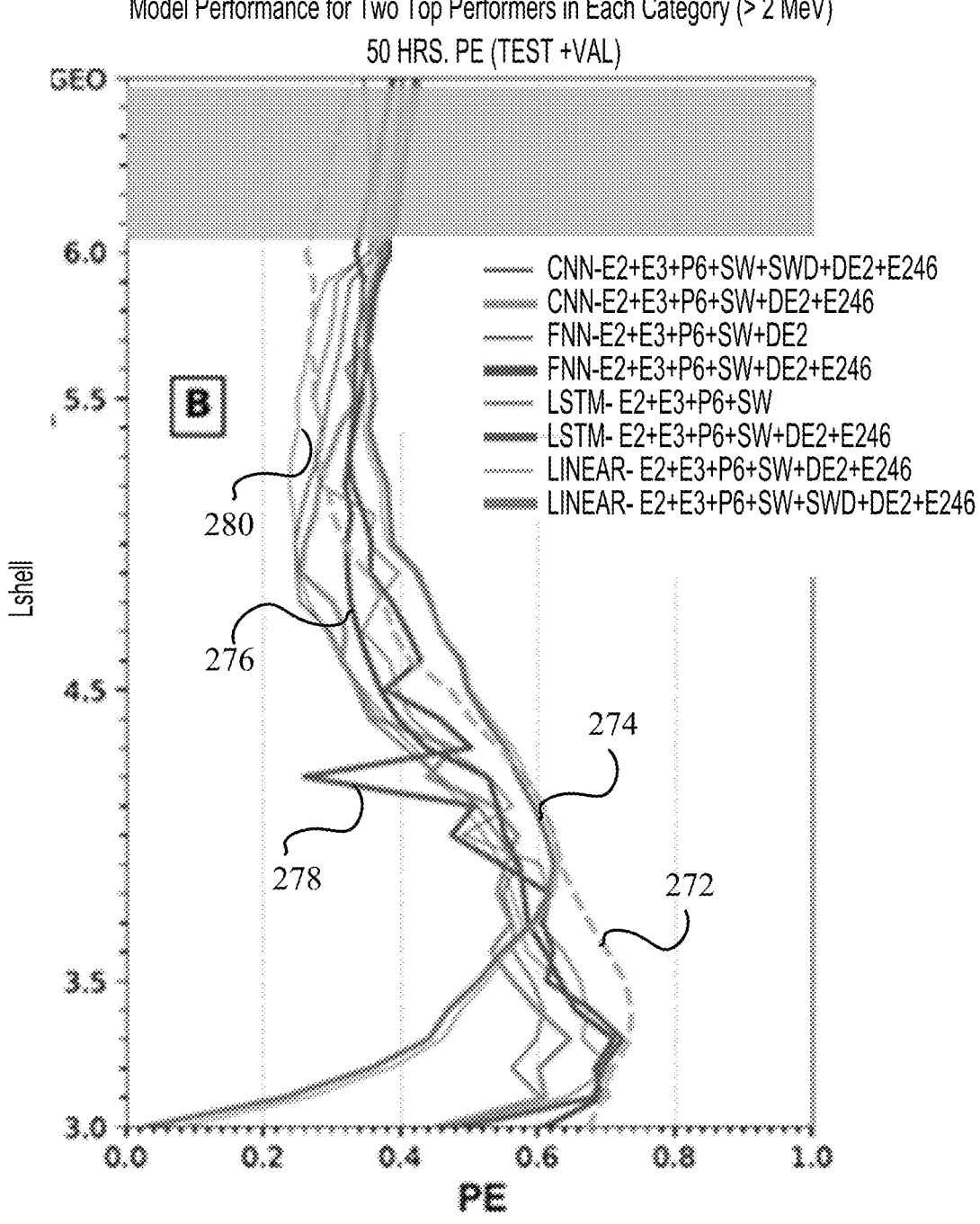

Referring now to FIGS. 2B and 2B Cont., model PE values for validation and test data for Tables 1-2 as a function of L-shell for the top two performers in each category forecasting greater than 2 MeV electrons are shown, according to some nonlimiting examples. It is appreciated that the top two performers of each category for 1-day (25 hr) forecasts are listed in Table 1. The PE curves 271 and 272 for the top linear model from a similar method making 1-day forecasts of 1 MeV electrons is plotted for comparison. It is appreciated that the top two performers from each category for 2-day (50 hr) forecasts as listed in Table 2 are selected. It is appreciated that the PE curves 271 and 272 for the top linear model making 2-day forecasts of 1 MeV electrons form a similar method is also plotted for comparison.

PE curves for the top two performers in each category for one- and two-day forecasts are further compared as a function of L-shell. It is appreciated that comparing panels A and B illustrates that no one individual model outperforms others over all L-shells. For example, linear models 273-274 have higher PE at L-shells above ~3.8, while the top FNN 275-276 and LSTM 277-278 models perform better at small L-shells than the quickly degrading linear ones. Moreover, the PE curves 271 and 272 for the top linear model from a similar method for 1 MeV electrons are plotted for comparison. It can be seen that for this new model PE curves for the linear ones 273 and 274 and 279-280 have higher PE at L-shells >4.5 for 1-day (>4.0 for 2-day) but lower PE at smaller L-shells than PE curves 271 and 272.

Figure 2C:
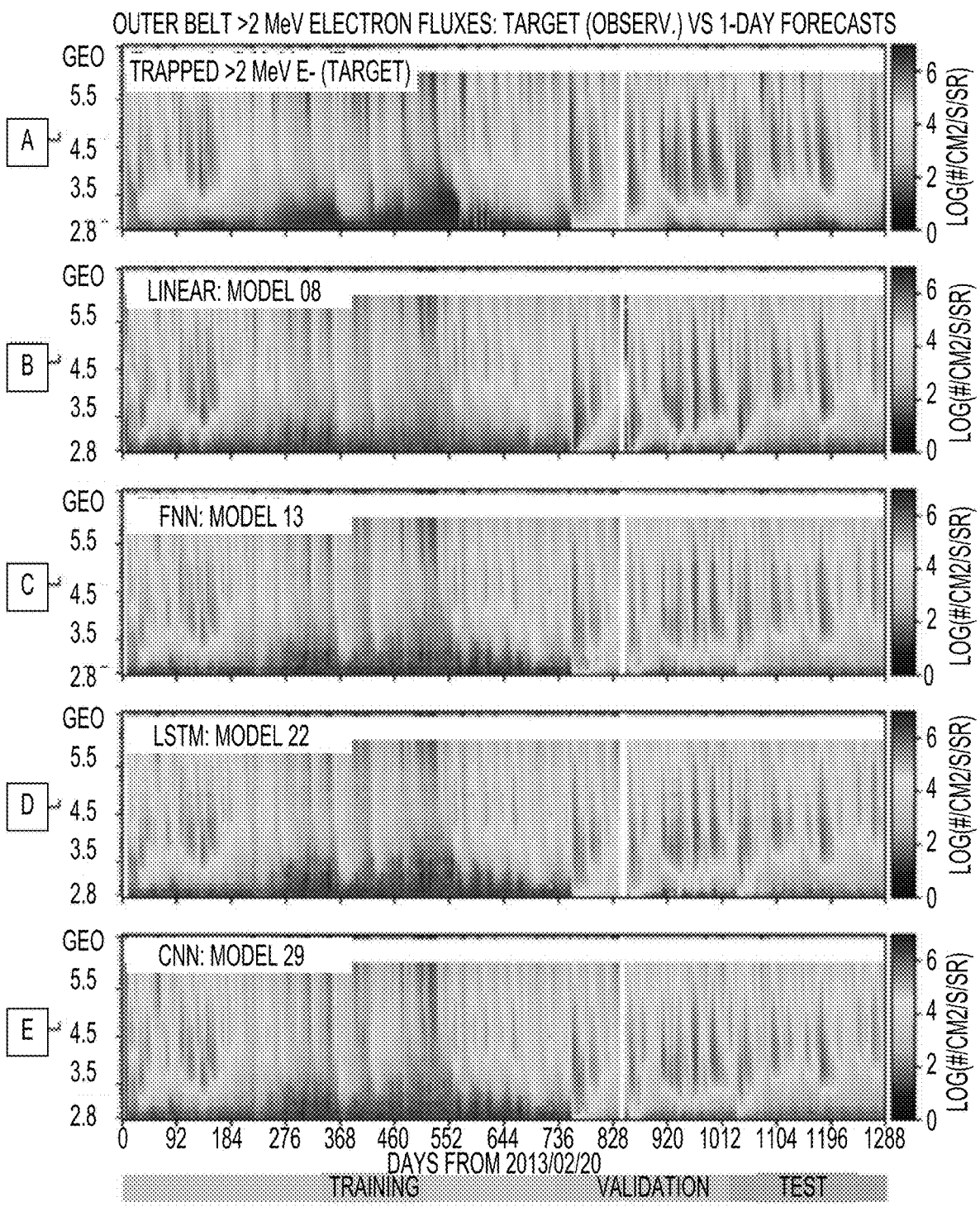
FIG. 2C shows an overview of target and 1-day forecasted greater than 2 MeV electron fluxes of Table 1 across all L-shells, according to some nonlimiting examples.

Referring now to FIG. 2C, an overview of target and 1-day forecasted greater than 2 MeV electron fluxes of Table 1 across all L-shells is illustrated, according to some nonlimiting examples. Panel A is the observed flux distributions to be forecasted for higher electron events (e.g., greater than 2 MeV). Panels B-E illustrate 1-day forecasted flux distributions by the four top performers, each with the highest out-of-sample PE from one category, including the linear regression model 8, FNN model 13, LSTM model 22, and CNN model 29 as listed in Table 1.

Panels B-E illustrate that the models, as selected, that perform similar to those observed in target data. Over the entire interval, most MeV electron events are captured well in terms of both intensities and L-shell ranges. Exceptions include the significant electron dropouts, e.g., on days ~1080 at L>5, and the deep electron injections into small L-shells below 3.0.

Figure 2D:
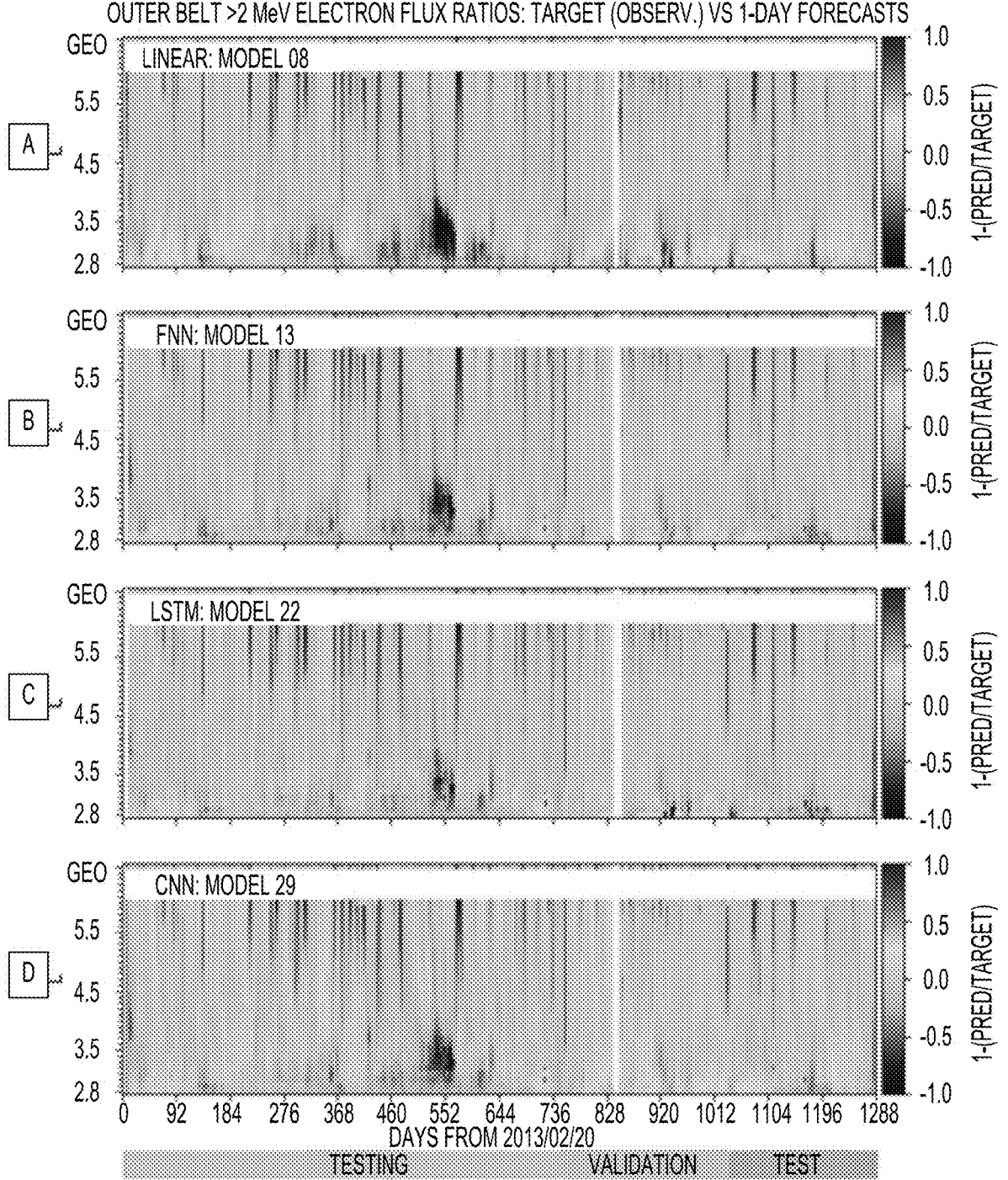
FIG. 2D shows relative error ratios of 1-day forecasts across all L-shells according to Table 1 for higher electron events (i.e., greater than 2 MeV), according to some non-limiting examples.

Referring now to FIG. 2D, relative error ratios of 1-day forecasts across all L-shells according to Table 1 for higher electron events (i.e., greater than 2 MeV) is shown, according to some nonlimiting examples. Panels A to D plot the deviations ratios, defined as targets minus forecasts, which is then divided by the targets, as a function of L-shell and time for linear regression model 8, FNN model 13, LSTM model 22, and CNN model 29, respectively, the four top performers as listed in Table 1. It is appreciated that FIG. 2D illustrates perfect predictions in most instances (in green) with certain instances of under-predictions and over-predictions in red and blue.

It is appreciated that in the validation and test periods, the lack of dark vertical strips suggests the onsets of higher electron events (i.e., greater than 2 MeV) are well predicted, while the clear vertical strips reflect the predicted high fluxes during dropouts, which is acceptable since this model aims to predict the enhancements of energetic electrons. The dark regions at small L-shells ~2.8 and 2.9 during the validation and test periods, particularly in Panel A, indicate models' lack of high performance in those area. It is appreciated that lack of performance may be due to presence of low L-shells training data that is dominated by background and the ML algorithms that can learn only from the single major event starting on day ~758, while there are up to three events during the validation and test periods.

Figure 2E:
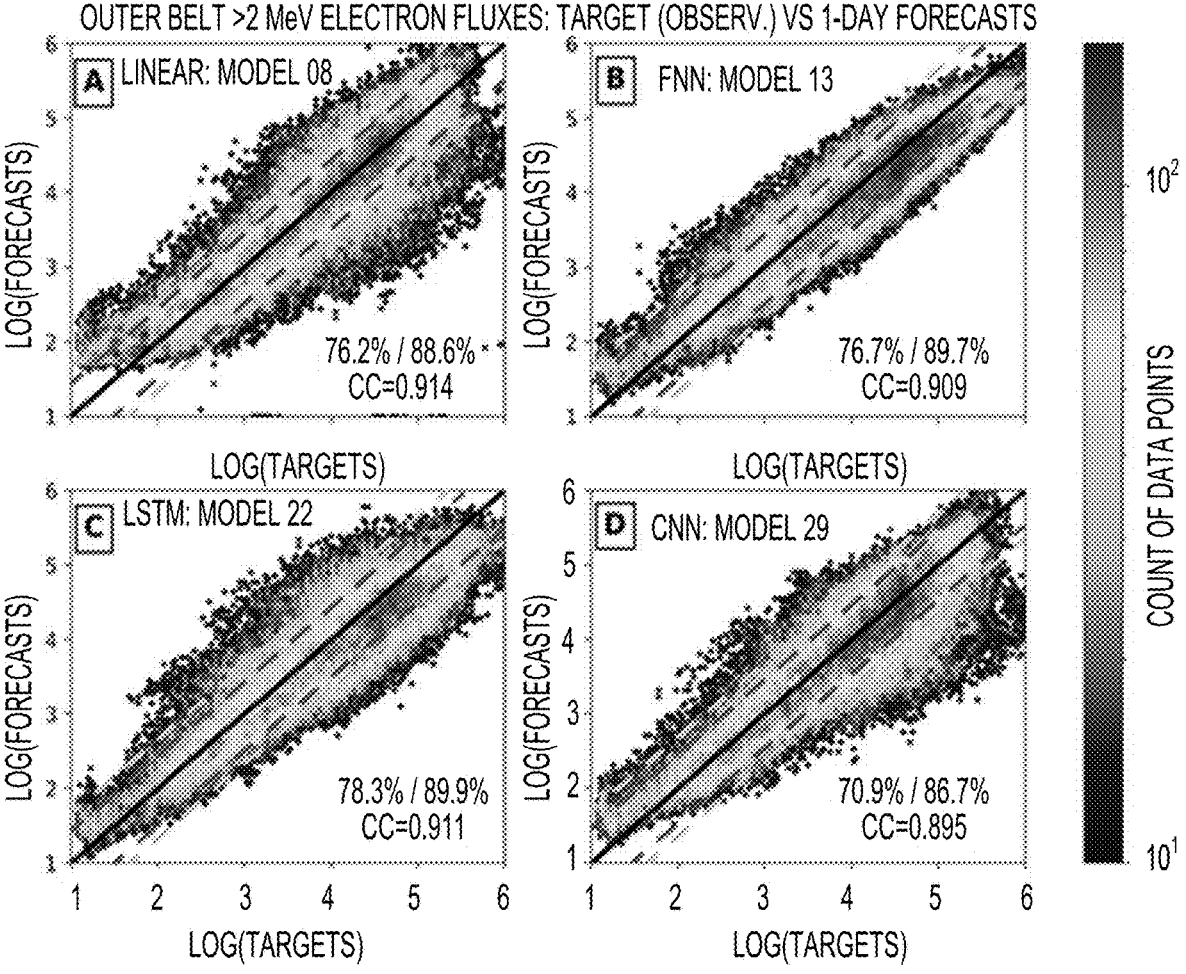
FIG. 2E shows model prediction of top four performers versus target 2D histograms for 1-day forecasted for higher electron events of greater than 2 MeV electron fluxes in Table 1 across all L-shells, according to some nonlimiting examples.

Referring now to FIG. 2E, model prediction of top four performers versus target 2D histograms for 1-day forecasted for higher electron events of greater than 2 MeV electron fluxes in Table 1 across all L-shells is shown, according to some nonlimiting examples. Histogram of the fluxes predicted by linear regression model 8 (the linear top performer as in Table 1 is compared to the target, which is the actual observation of higher electron events of greater than 2 MeV electron fluxes. It is appreciated that the position of each pixel compares the predicted and target fluxes and the pixel shading counts the occurrences over the interval. The shading bar indicates the count of points in bins of size 0.1×0.1. Similarly, panels B-D illustrate the comparison of the predictions for FNN model 13, LSTM model 22, and CNN model 29, which are the top performers in Table 1 to the target (the actual observation of higher electron events of greater than 2 MeV). It is appreciated that the diagonal lines on both sides of the diagonal line mark error factor ratios of 3 (5) and 1/3 (1/5) between predicted and observed fluxes (original flux values not in logarithm). It is appreciated that the diagonal line (in solid black) in each panel illustrates a perfect match between the forecast and the observed target. It is appreciated that the dashed dark gray (and light gray) lines illustrate the ratio—between original fluxes—factors of 3 (and 5). In this example, the dark gray (light gray) number in lower-right is the percentage of points falling within the factors of 3 (5), and the red number shows the correlation coefficient is. As illustrated, the majority of the points fall close to the diagonal and are well contained, particularly the points in the upper right quarter during MeV electron events. The two percentages in the lower right illustrate the data points that fall within the two pairs of factor lines. In panels A-D, CC is the correlation coefficient value. It is seen that all models have high CC values and that the forecasts have error ratios within the factors of 3 (5). The PE, the CC values, and/or the percentages quantify performance of the top four models according to some nonlimiting examples.

Figure 2F:
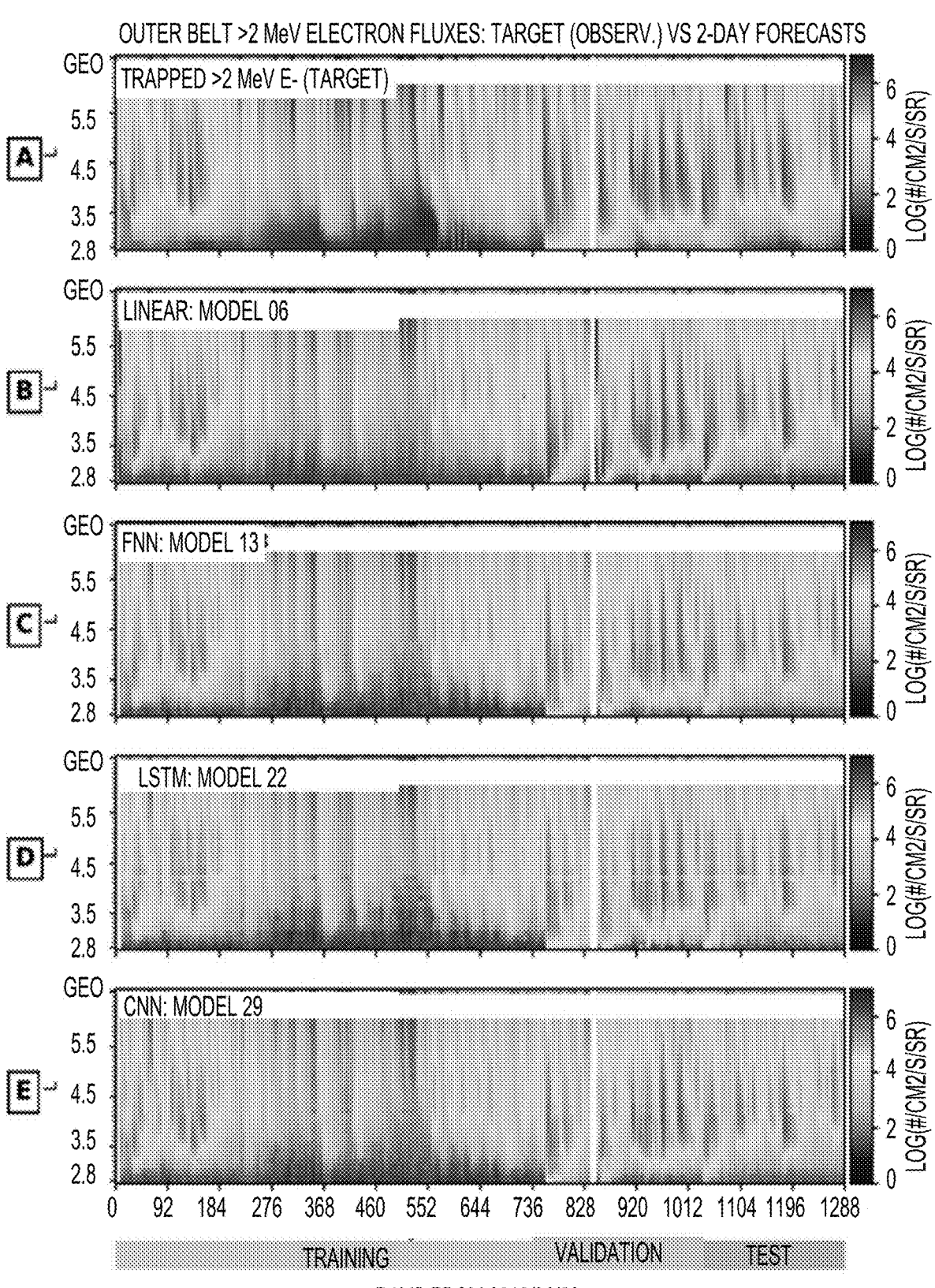
FIG. 2F shows an overview of target and 2-day forecasted fluxes across all L-shells of Table 2, according to some nonlimiting examples.

Referring now to FIG. 2F, an overview of target and 2-day forecasted fluxes across all L-shells of Table 2 is shown, according to some nonlimiting examples. Panel A is the observed flux distributions to be forecasted for higher electron events (e.g., greater than 2 MeV). Panels B-E illustrate 2-day forecasted flux distributions by the four top performers, each with the highest out-of-sample PE from one category, including the linear regression model 6, FNN model 13, LSTM model 22, and CNN model 22 as listed in Table 2.

Panels B-E illustrate that the models, as selected, perform similar to those observed in target data. Over the entire interval, most MeV electron events are captured well in terms of both intensities and L-shell ranges. It is appreciated that the features, as illustrated by FIG. 2F, are similar to that illustrate by FIG. 2C, including the resemblance between forecasts and observations as well as the misses at low L-shells of 2.8 and 2.9. It is appreciated that Panel D includes some "patchiness" at L=4.2, where predicted fluxes by LSTM model 22 are persistently lower than those in neighboring L-shells. A similar patchiness can also be seen in Panel E. Considering the L-shell dependent performance of the models, the ensemble forecasts have been tested for optimization, using a combination of linear and nonlinear models. As described above, the ensemble forecast in one nonlimiting example provides the ensemble mean that acts as a nonlinear filter that is statistically higher performance in comparison to any ensemble individual member.

Figure 2G:
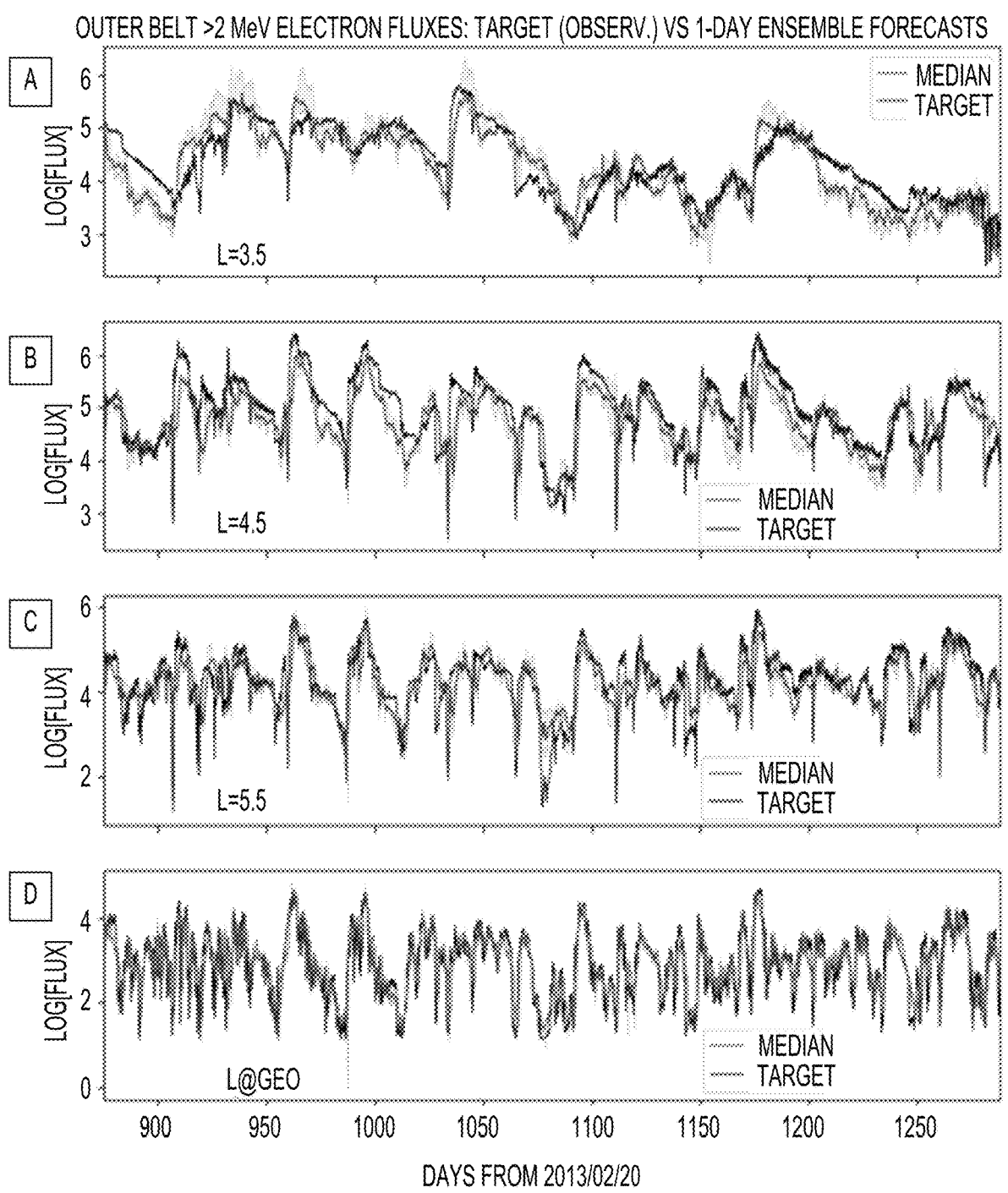
FIG. 2G shows one-day ensemble 1-day forecasting results for higher electron events of greater than 2 MeV electron fluxes over individual L-shells, according to some nonlimiting examples.

Referring now to FIG. 2G, one-day ensemble forecasting results for higher electron events of greater than 2 MeV electron fluxes over individual L-shells are shown, according to some nonlimiting examples. Results are shown for the validation and test periods, and panels from the top to bottom are for L-shells at 3.5, 4.5, 5.5, and GEO (6.6), respectively. In each panel, the target is shown in bold black, and the gray strip shows the uncertainty ranges (or standard deviations) from the ensemble group, and the median from the ensemble predictions is illustrated in bright red color. It is appreciated that while the uncertainties from the ensemble models may vary spatially and/or temporally, the median values nonetheless follow the targets closely.

As shown in the last row of Table 1, ensemble members include linear regression model 8, FNN model 13, LSTM model 22 and CNN model 29, which are the top four performing models in each of the four categories. At each time step the ensemble prediction of electron fluxes at one L-shell is the median of all four member model outputs, and standard deviation of the outputs is the measure of uncertainty. It is appreciated that the ensemble model may be used not only to reliably predict occurrences of higher electron events, but also to predict the uncertainty or spread in the model.

Figure 2H:
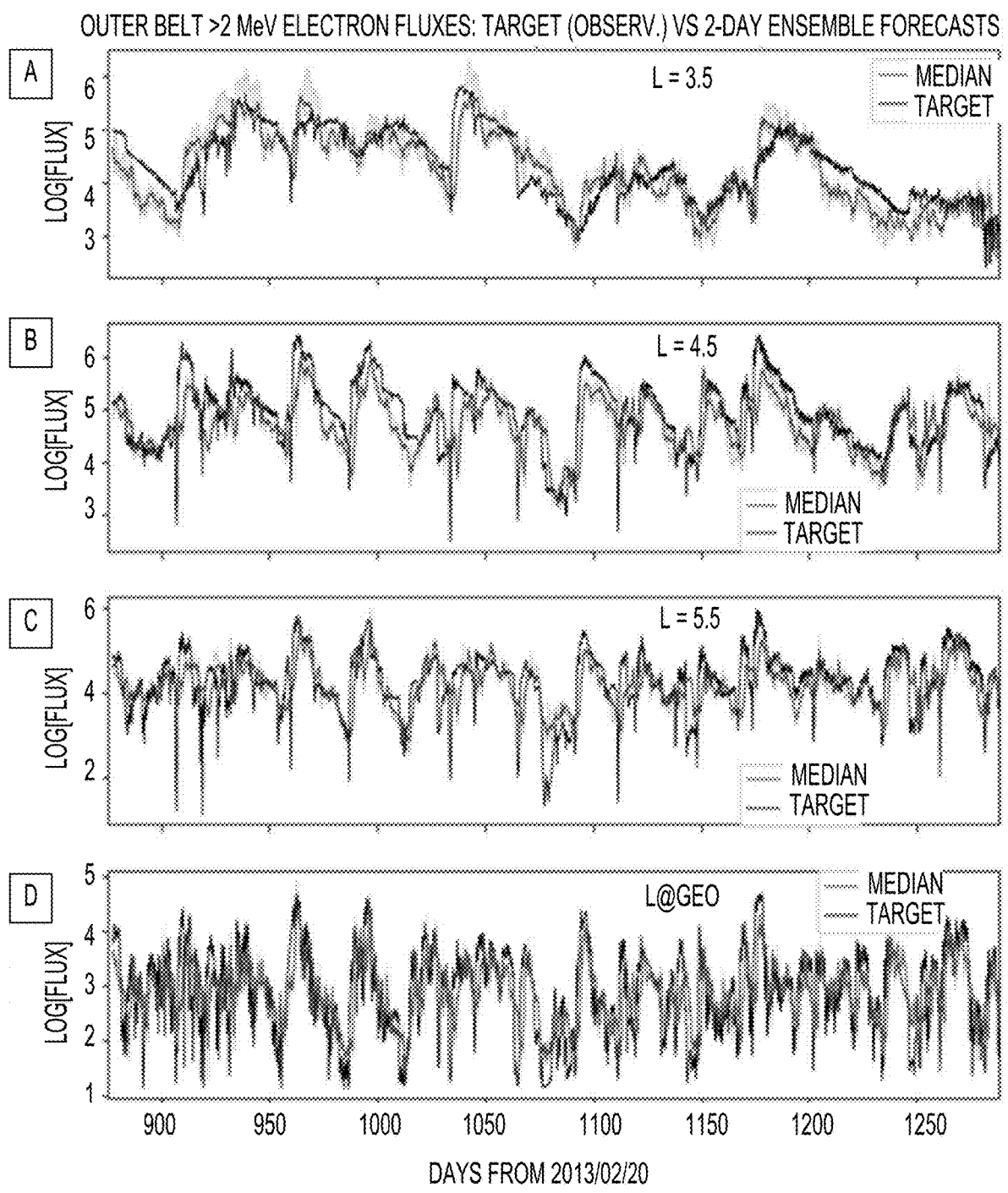
FIG. 2H shows two-day ensemble forecasting results for higher electron events of greater than 2 MeV electron fluxes over individual L-shells, according to some nonlimiting examples.

Referring now to FIG. 2H, two-day ensemble forecasting results for higher electron events of greater than 2 MeV electron fluxes over individual L-shells is shown, according to some nonlimiting examples. FIG. 2H is similar to that of FIG. 2G except that it is a 2-day forecast and that the ensemble group is different, as shown in the last row of Table 2.

Figure 2I:
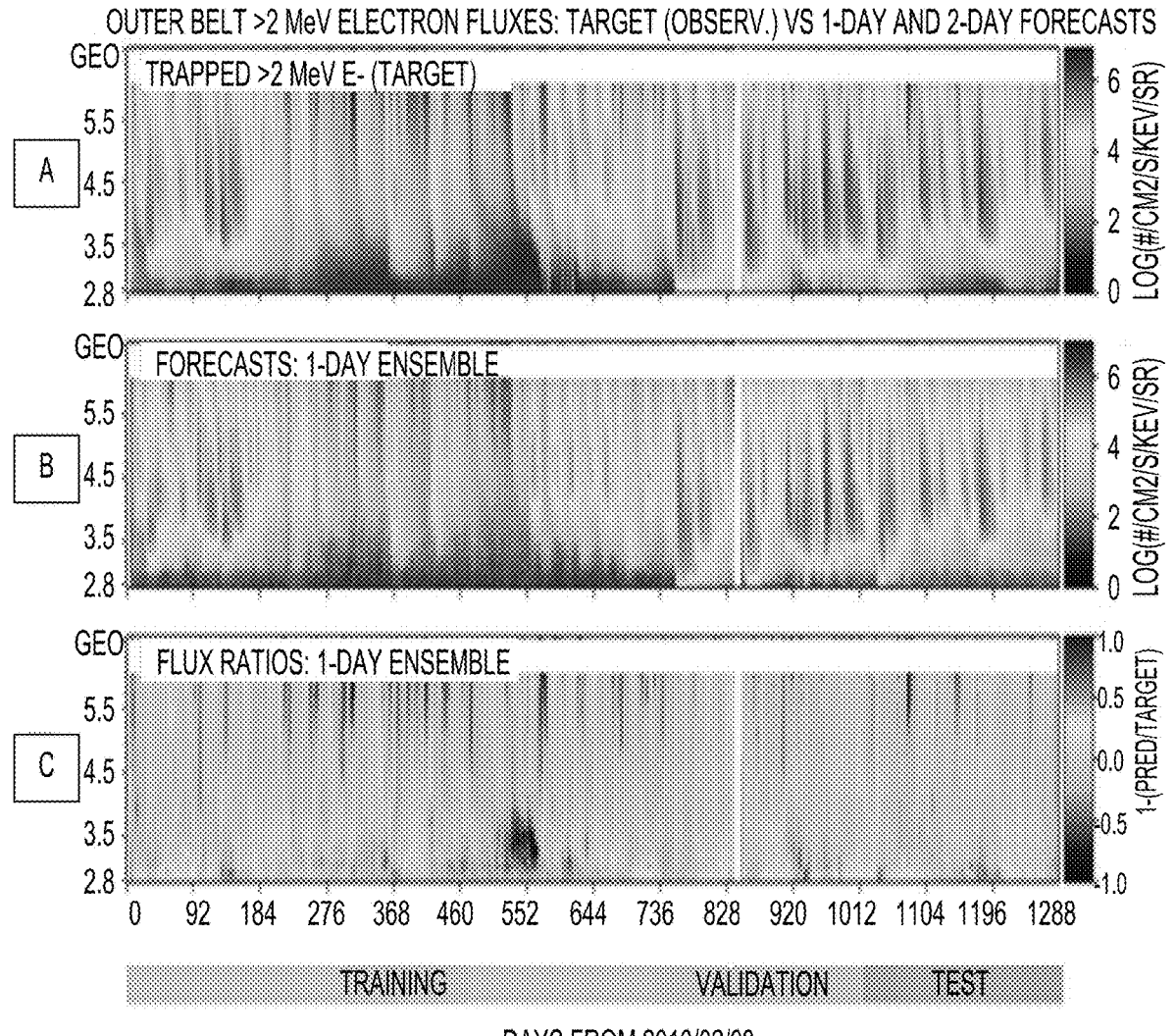
FIGS. 2I and 2I Cont. show an overview of target versus 1-day and 2-day ensemble forecasted for higher electron events of greater than 2 MeV electron fluxes and relative error ratios across all L-shells, according to some nonlimiting examples.
Figure 2I:
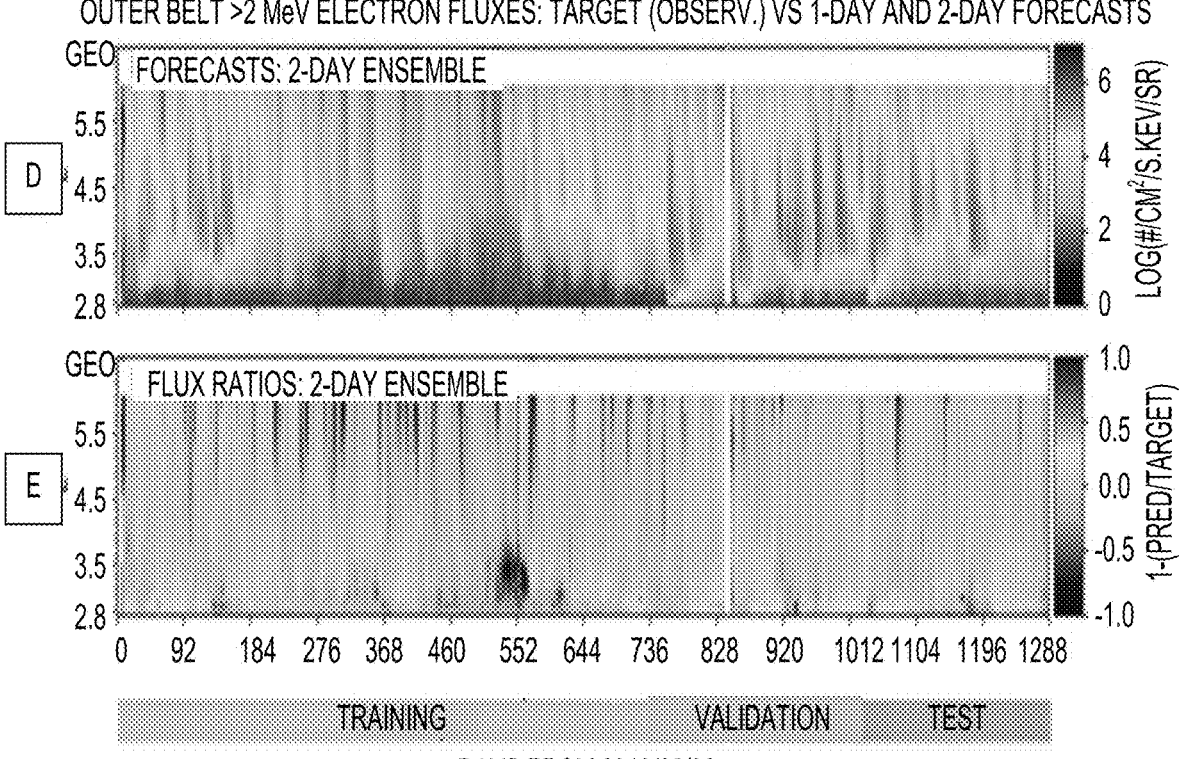

Referring now to FIGS. 2I and 2I Cont., an overview of target versus 1-day and 2-day ensemble forecasted for higher electron events of greater than 2 MeV electron fluxes across all L-shells is shown, according to some nonlimiting examples. Panel A illustrates the observed flux distributions. It is appreciated that panel B illustrates a 1-day predicted flux distributions from the ensemble model (from Table 1 above) and panel C illustrates the deviation ratios between the target and 1-day predicted fluxes. Panels D and E are similar to panels B and C of 2-day ensemble forecasts that have been described above.

As illustrated, there are noticeable improvements, including the better predictions of low fluxes at L-shells ~3.5, e.g., centered on day 552 during the training in Panel B, and the deep injections to low L-shells during the validation and test periods when compared to the linear model in FIG. 2C. Also, the "patchiness" previously observed in 2-day forecasts in LSTM model has been much alleviated here in Panel D.

Figure 2J:
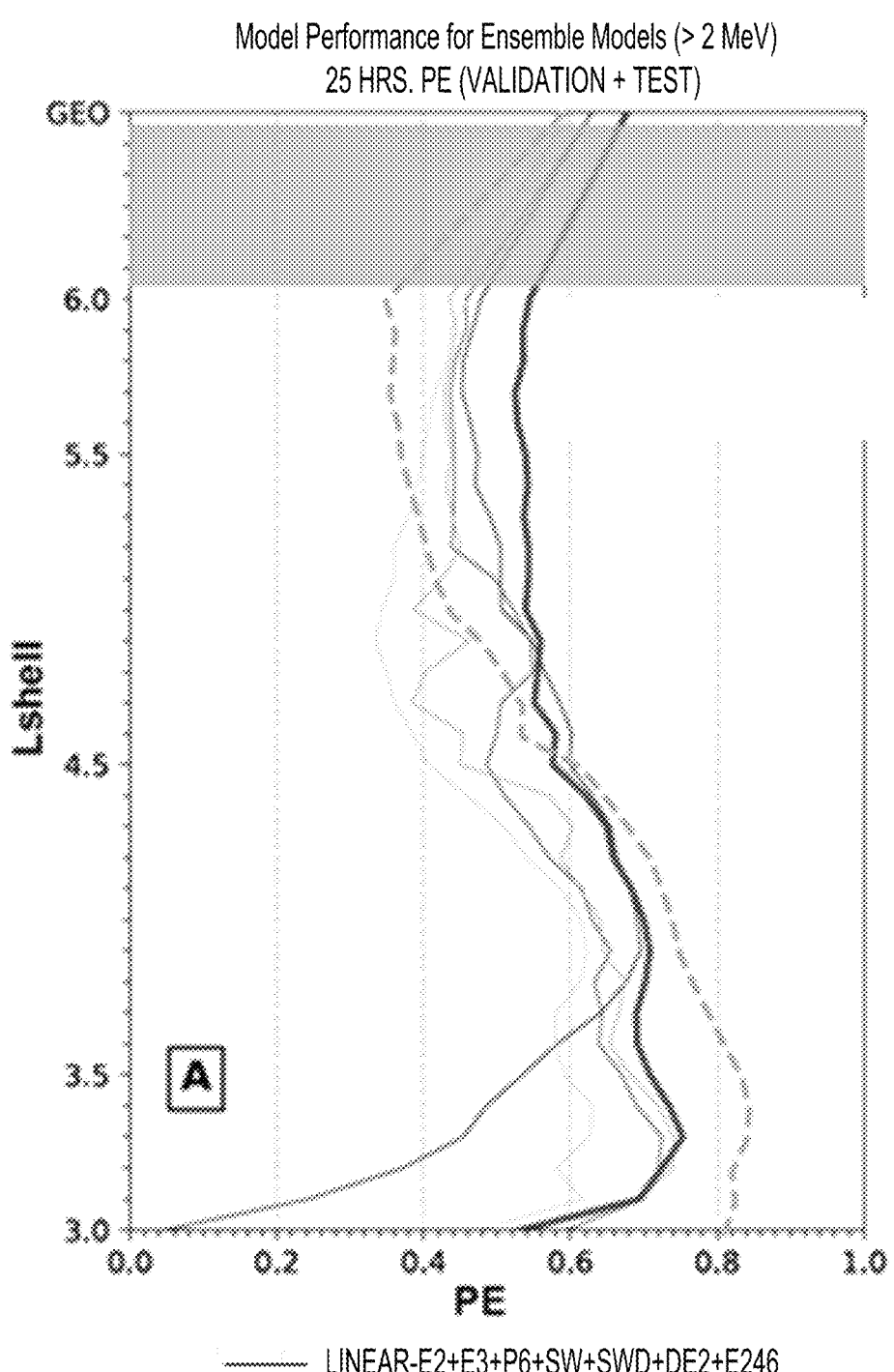
FIGS. 2J and 2J Cont. show model PE values for validation and test data as a function of L-shell for ensemble models 1-day and 2-day forecasting higher electron events of greater than 2 MeV electrons, according to some nonlimiting examples.
Figure 2J:
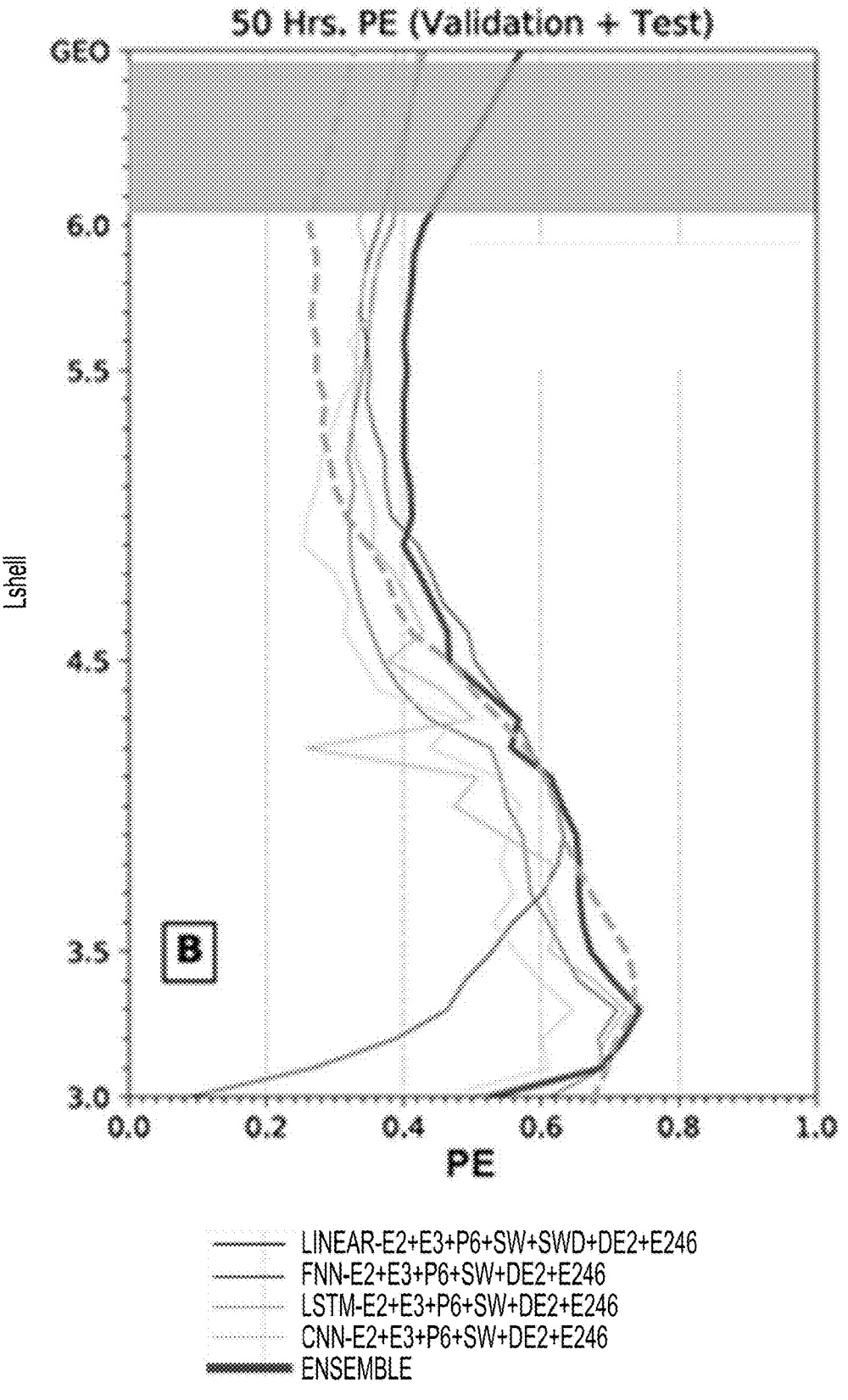

Referring now to FIGS. 2J and 2J Cont., model PE values for validation and test data as a function of L-shell for ensemble models 1-day and 2-day forecasting higher electron events of greater than 2 MeV electrons is shown, according to some nonlimiting examples. Panel A illustrates the PE curves for 1-day forecasting models. The thick black curve represents the ensemble model compared to four individual ensemble member models displayed in different colors. The PE curve for the top linear model from a similar method for making 1-day forecasts of 1 MeV electrons is plotted in dashed gray for comparison. Panel B illustrates the PE curves for 2-day forecasting models. The red curve represents the ensemble model compared to four individual ensemble member models (as defined in Table 2). The PE curve for the top linear model of a similar method for making 2-day forecasts of 1 MeV electrons is plotted in long-dashed gray for comparison.

As illustrated, in one nonlimiting example, the PE may be used to quantify model performance, comparing the ensemble PE curves to those of group members as a function of L-shell. It is appreciated that the ensemble PE curve (in red) that illustrates the ensemble model is almost always to the rightmost for all L-shells, including at GEO, when compared to PE curves of its four member models individually. In other words, the ensemble model outperforms each individual members individually. Moreover, in comparison to the PE curves in dashed gray from the linear model of similar methods for 1 MeV electrons, the ensemble forecasts presented herein have at least comparable performance in Panel A for 1-day or have even better performance as shown in Panel B for 2-day forecast, in particular at medium or high L-shells.

As illustrated in Tables 1 and 2, the ensemble models have a mean PE value of 0.612 for 1-day and 0.521 for 2-day at L≤6, and 0.677 and 0.572 at GEO. It is appreciated that these PE values are significantly higher than those from individual top performer models, thereby displaying the performance gain and advantage of using an ensemble model over any individual model. It is appreciated that the actual measured higher electron events, e.g., using the operational Relativistic Electron Forecast Model (REFM) at NOAA, has PE values of 0.72 and 0.49 at GEO for 1-day and 2-day predictions for daily averaged fluence of great than 2 MeV electrons, whereas the discussed ensemble model has PE values of ~0.68 and ~0.57 at GEO for 1-day and 2-day forecasts with 5 hour time resolution. Additionally, besides GEO, the ensemble model also has similar predictive performance across L-shells between 3 and 6 in the heart of the outer belt.

It is appreciated that the number of members within the ensemble group, as described, is for illustrative purposes and should not be construed as limiting the scope of the embodiments. For example, in some examples more than 32 ML models may be generated and the ensemble group may include eight model members, as an example. It is further appreciated that a hybrid model may be employed where the best performing models are used at each L-shell instead of selecting the same model across all L-shells. For example, this hybrid model may combine nonlinear models at small L-shells (e.g., L<3.5) and include more linear models at large L-shells depending on their ranks in PE.

Figure 2K:
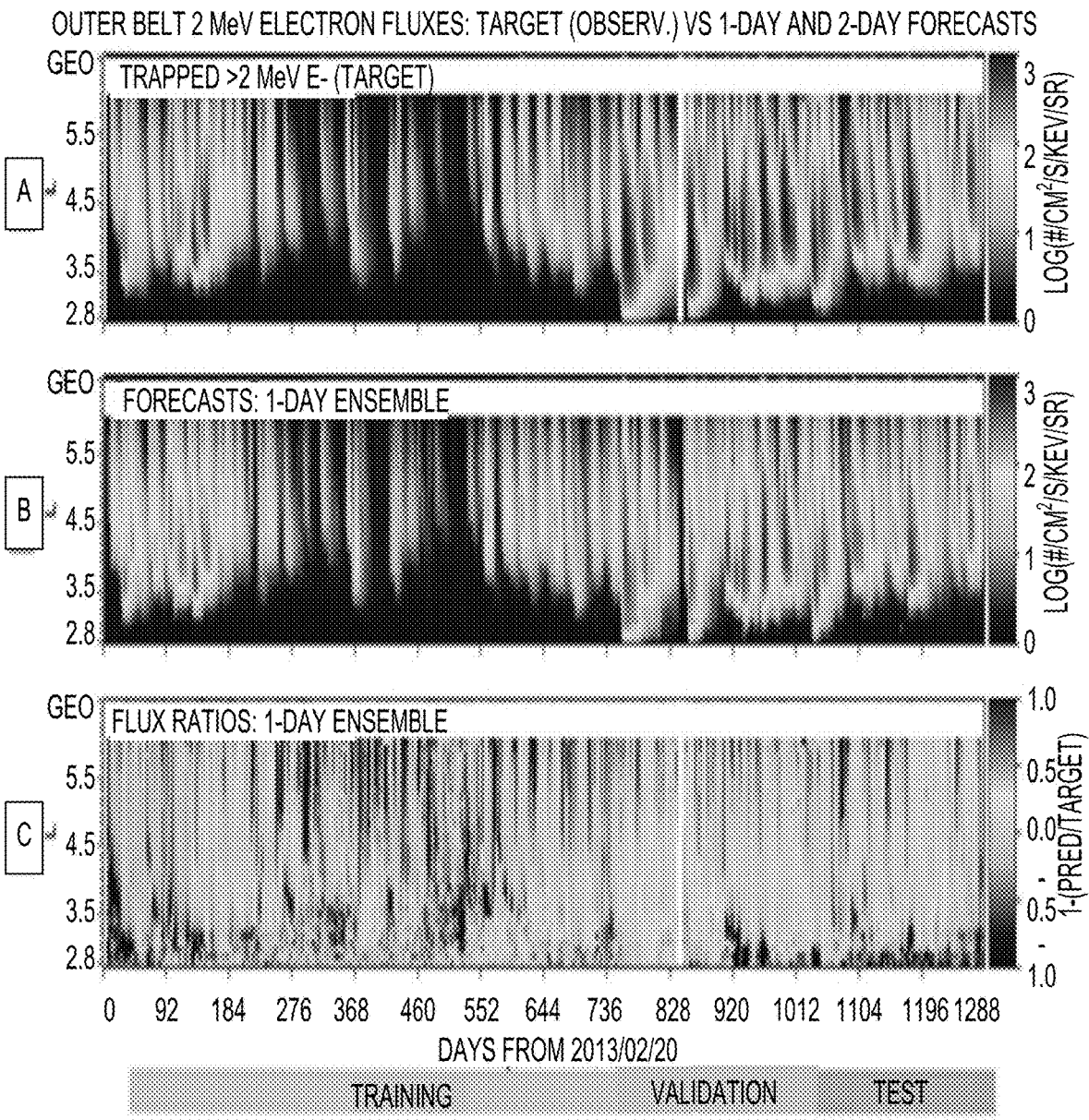
FIGS. 2K and 2K Cont. show an overview of target versus 1-day and 2-day ensemble forecasted of higher electron events of equal to 2 MeV electron fluxes and relative error ratios across all L-shells, according to some nonlimiting examples.
Figure 2K:
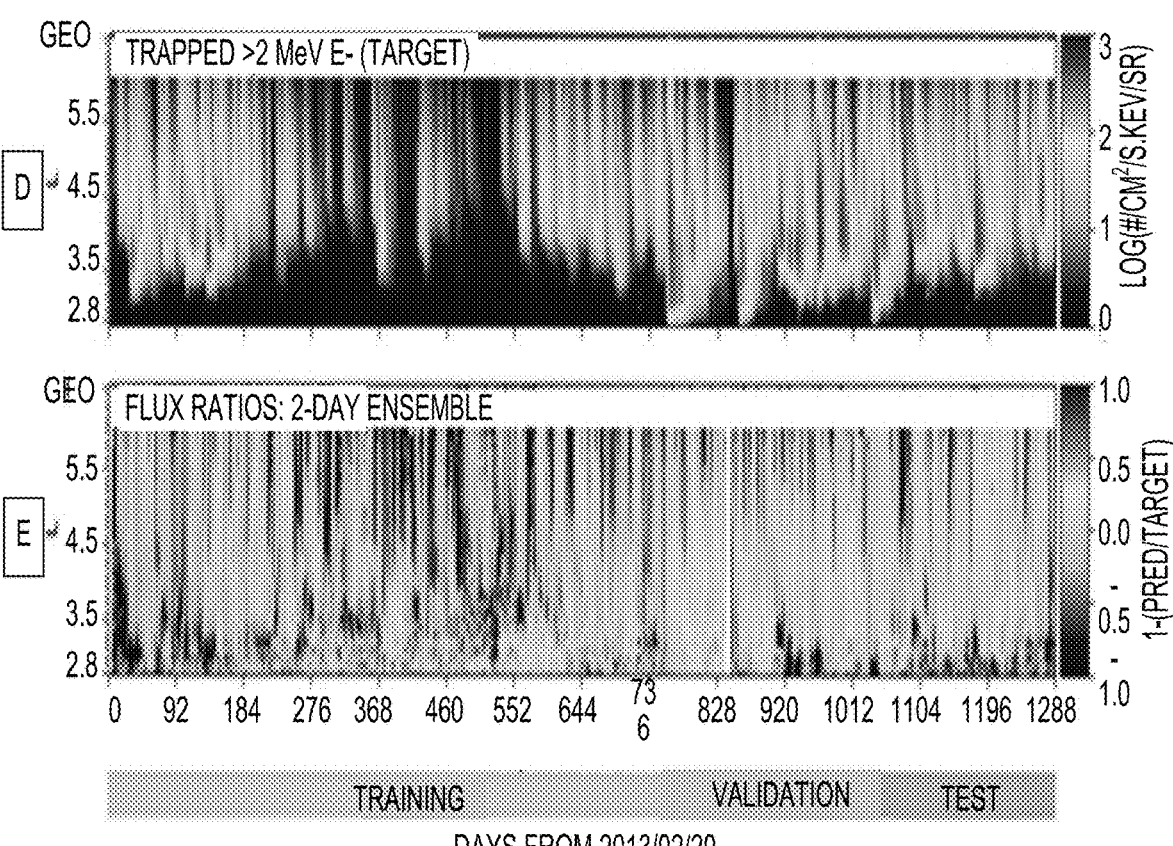

Referring now to FIGS. 2K and 2K Cont., an overview of target versus 1-day and 2-day ensemble forecasted of higher electron events of equal to 2 MeV electron fluxes across all L-shells is shown, according to some nonlimiting examples. It is appreciated that the panels A-E are similar to those described in FIG. 2I, as described above, but directed to higher electron events of equal to 2 MeV and as shown in Tables 3-4. The observed and ensemble forecasted flux distributions are compared over the entire interval. As illustrated, the 1-day ensemble forecasts (Panel B) operates similar to the actual target distributions (Panel A). It is appreciated that the vertical strips in the error ratio distribution (Panel C) at L>~4 suggest that the forecasts often miss the very beginning of the onsets of MeV electron events. Similar features are seen in Panels D and E for 2-day ensemble forecasts.

It is appreciated that the effects of model input parameters and window sizes are examined. The mean PE values for individual models are presented in Tables 3 and 4 for 1-day and 2-day forecasts, respectively. In Table 3, mean PE values of the four top (second) performers are 0.600 (0.590) for linear regression, 0.549 (0.548) for FNN, 0.549 (0.533) for LSTM, and 0.525 (0.518) for CNN, while their PE values at GEO are 0.566 (0.568), 0.461 (0.535), 0.509 (0.539), and 0.459 (0.437), which are lower than the highest for each category. In Table 4, the mean PE values of the four top (second) performers are 0.512 (0.506) for linear regression, 0.474 (0.461) for FNN, 0.438 (0.435) for LSTM, and 0.439 (0.425) for CNN, while their PE values at GEO are 0.234 (0.244), 0.186 (0.105), 0.138 (0.106), and 0.102 (0.125), which are often far away from the highest value for each category. It is noteworthy that in this nonlimiting example, the top (and second) linear regression models have higher mean PE than all the remaining top performers for both 1-day and 2-day forecasts. Based on the rank of mean PE values, in the last row of Tables 3-4, ensemble forecasting models are constructed including the top performers from each of the four categories.

Figure 2L:
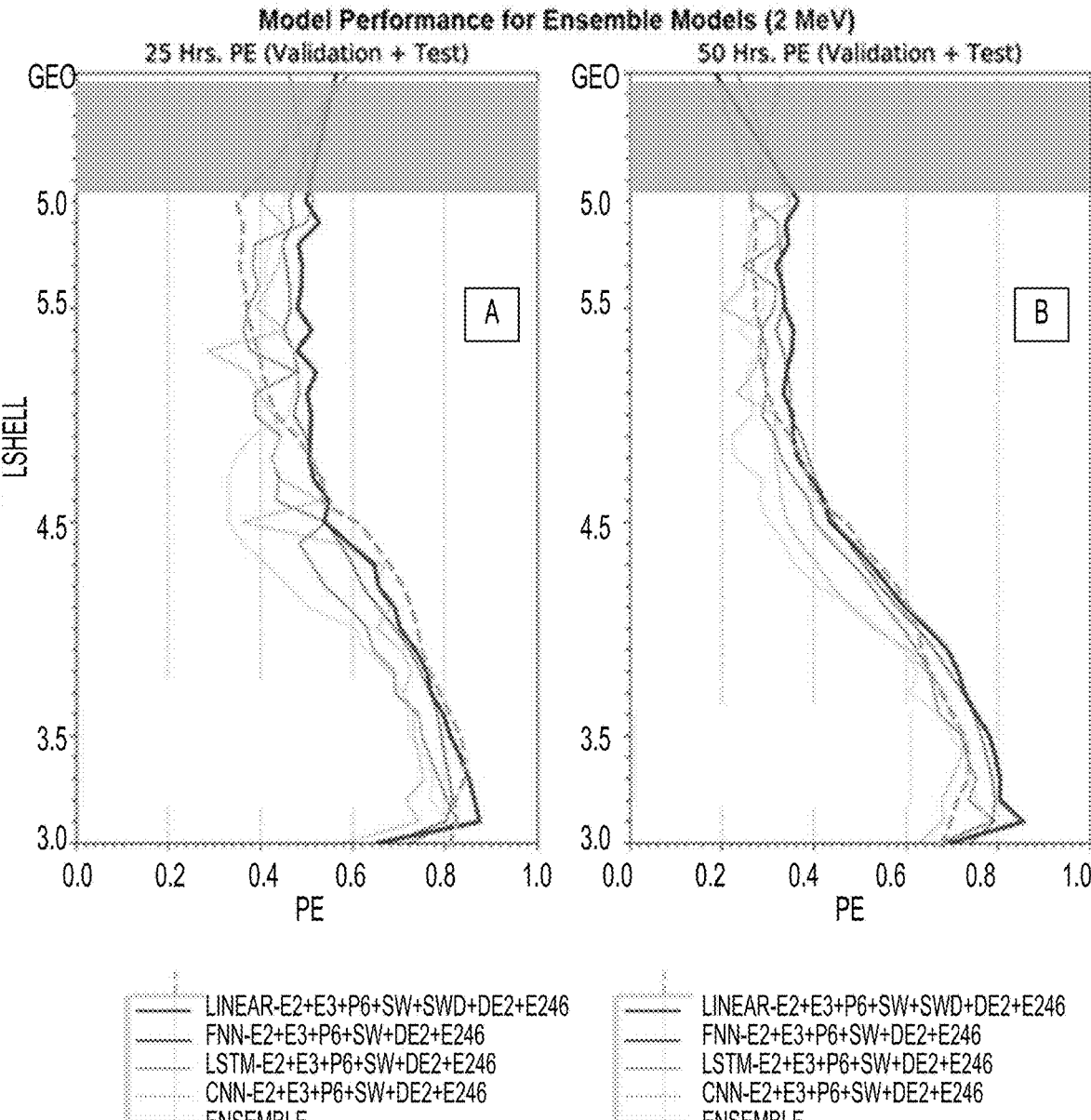
FIG. 2L shows model PE values for validation and test data as a function of L-shell for ensemble models 1-day and 2-day forecasting 2 MeV electron fluxes, according to some nonlimiting examples.

Referring now to FIG. 2L, model PE values for validation and test data as a function of L-shell for models forecasting 2 MeV electron fluxes are shown, according to some nonlimiting examples. Panel A illustrates the PE curves for 1-day (25 hr) forecasting models. The ensemble model (in red) is compared to the four individual ensemble member models (the top performers as shown in Table 3) in different colors. Panel B illustrates the PE curves for 2-day (50 hr) forecasting models. The ensemble model (in red curve) is compared to the four ensemble member models (as shown in Table 4). The PE curves for the top linear regression model for a similar method in 1-day and 2-day forecasts of 1 MeV are illustrated and plotted for comparison.

It is appreciated that the model performance may be quantified by comparing the ensemble PE curves to those of group members as a function of L-shell. Similar to FIG. 2J, the ensemble PE curves (in thick black) almost always stay to the rightmost for all L-shells when compared to the PE curves from the four member models individually. Therefore, the ensemble model outperforms each model member individually, as described above. It is appreciated that the ensemble model have comparable (Panel B) or even higher (A) PE values on average when compared to the PE curves (in long-dashed gray from the linear regression model) for 1 MeV electrons. From the last rows of Tables 3 and 4, the ensemble models have a mean PE value of 0.624 for 1-day and 0.521 for 2-day at L≤6, and 0.564 and 0.186 at GEO, and all of these mean PE values are higher than those from individual top performer models, but not at GEO.

Figure 2M:
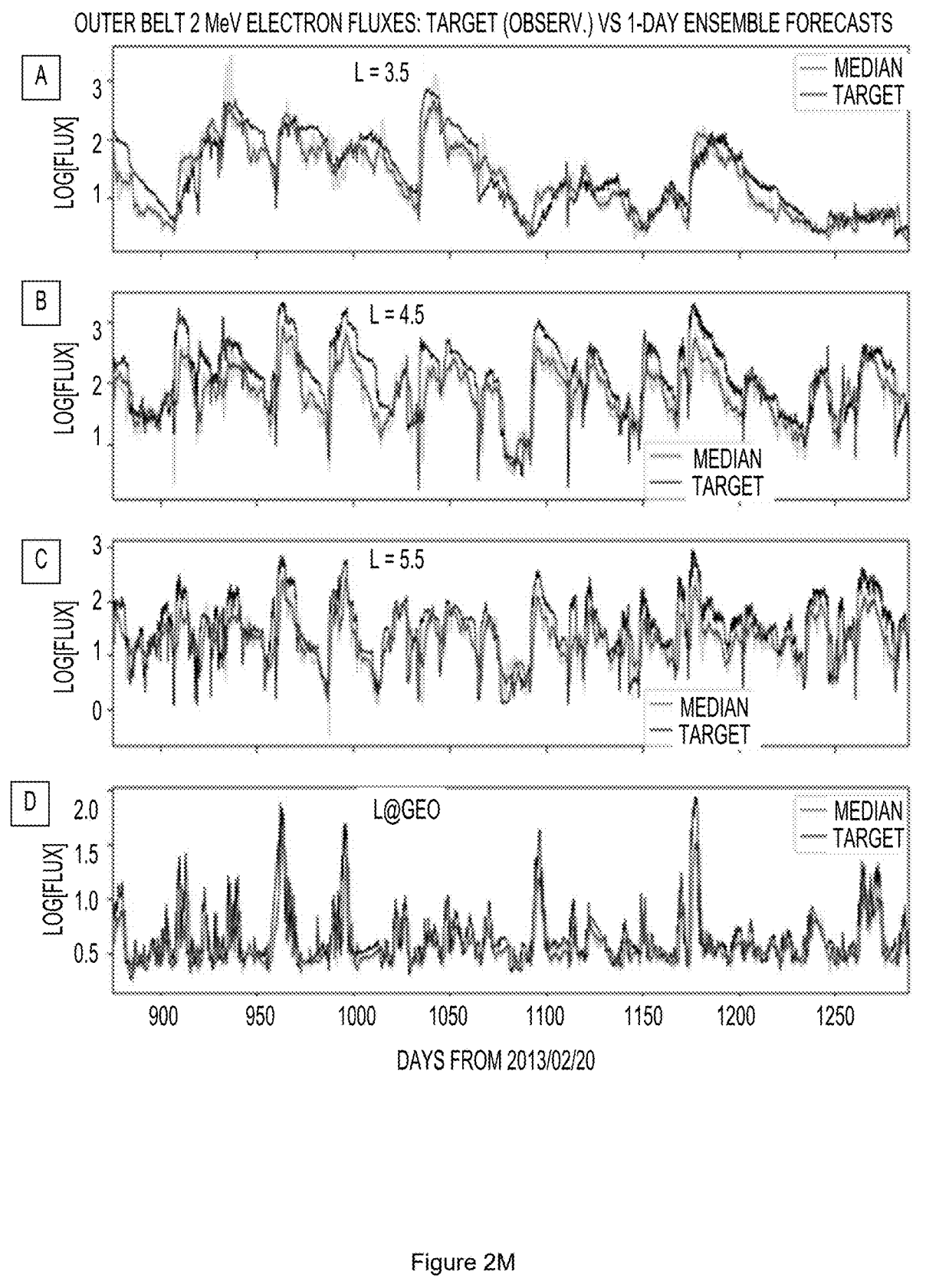

Referring now to FIG. 2M, one-day ensemble forecasting results for higher electron events at 2 MeV electron fluxes over individual L-shells are shown, according to some nonlimiting examples. Results are shown for the validation and test periods, and panels from the top to bottom (A through D) are for L-shells at 3.5, 4.5, 5.5, and GEO (6.6), respectively. In each panel, the target is shown in black, and the gray strip shows the uncertainty ranges (or standard deviations) from the ensemble group. The median from the ensemble predictions is shown in red.

Figure 2N:
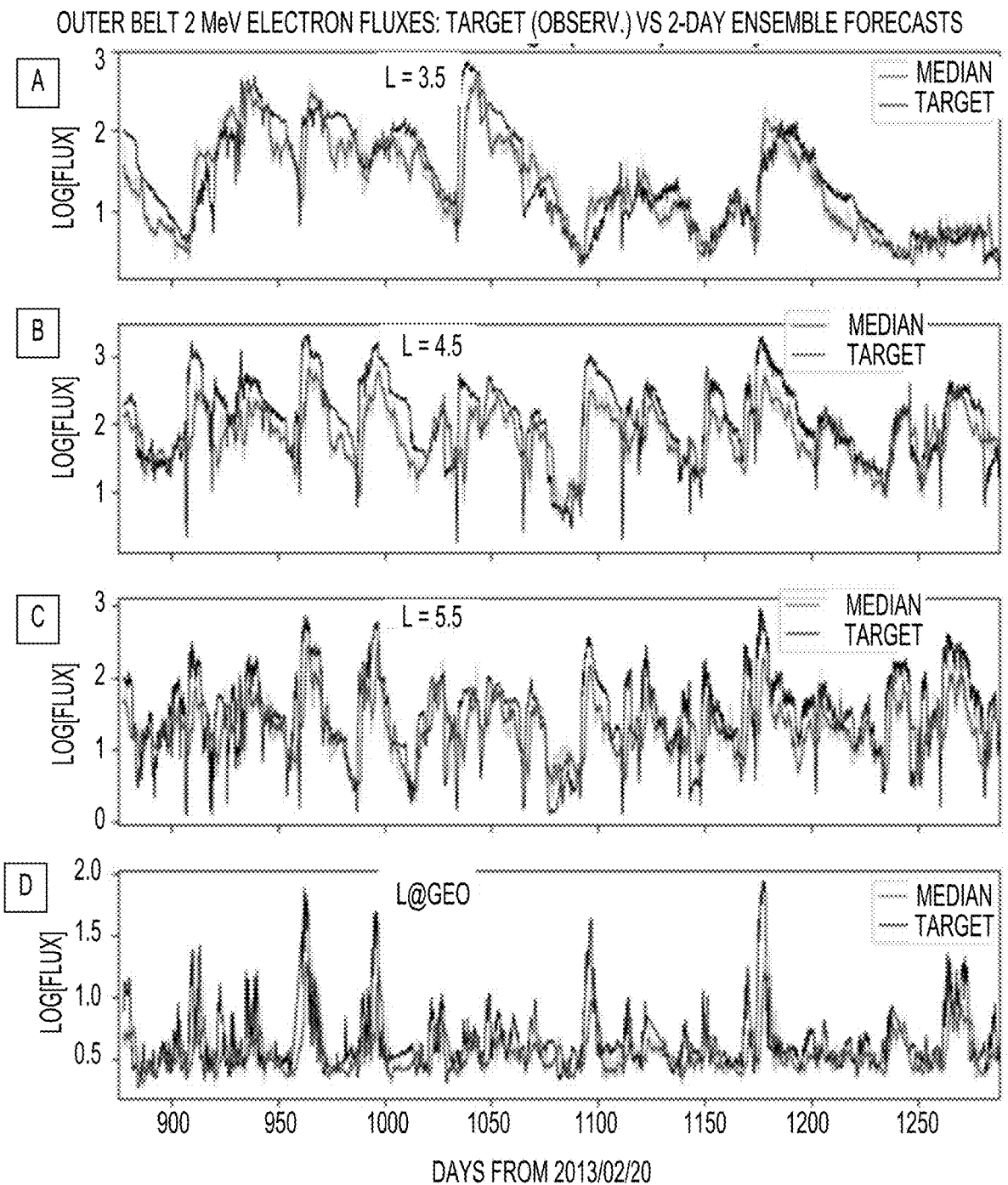
FIG. 2N shows 2-day ensemble forecasting results for higher electron events at 2 MeV electron fluxes over a range of L-shells, according to some nonlimiting examples.

Referring now to FIG. 2N, two-day ensemble forecasting results for higher electron events at 2 MeV electron fluxes over a range of L-shells are shown, according to some nonlimiting examples. FIG. 2N is similar to that of FIG. 2M except that it displays information associated with a 2-day forecast instead of 1-day forecast. It is appreciated that in Panel D, the 2-day forecasts at GEO, often has values much lower than those observed peak flux values, in particular during the several major events, which may explain the low PE value of 0.186 at GEO.

Accordingly, using electron data, e.g., from NASA's Van Allen Probes mission, various ML models have been trained (i.e., supervised), evaluated and tested for higher electron events of greater than or equal to 2 MeV electron fluxes. After evaluating the performance of these models, ensemble forecasting has performed demonstrably better than any model individually. The comparison of the performance (after the training stage) to that of the observed data demonstrates that the approach to generate the models and to leverage an ensemble model can reliably predict higher electron events, thereby eliminating the need for in-situ electron measurements.

It is appreciated that the model may be updated and evolved over time as more data becomes available. Data that becomes available may be from the same sources, as described above, or they may be from one or more different sources, e.g., GPS satellites, that can provide additional information, e.g., electron fluxes, given energy of particles, etc.

Figure 3:
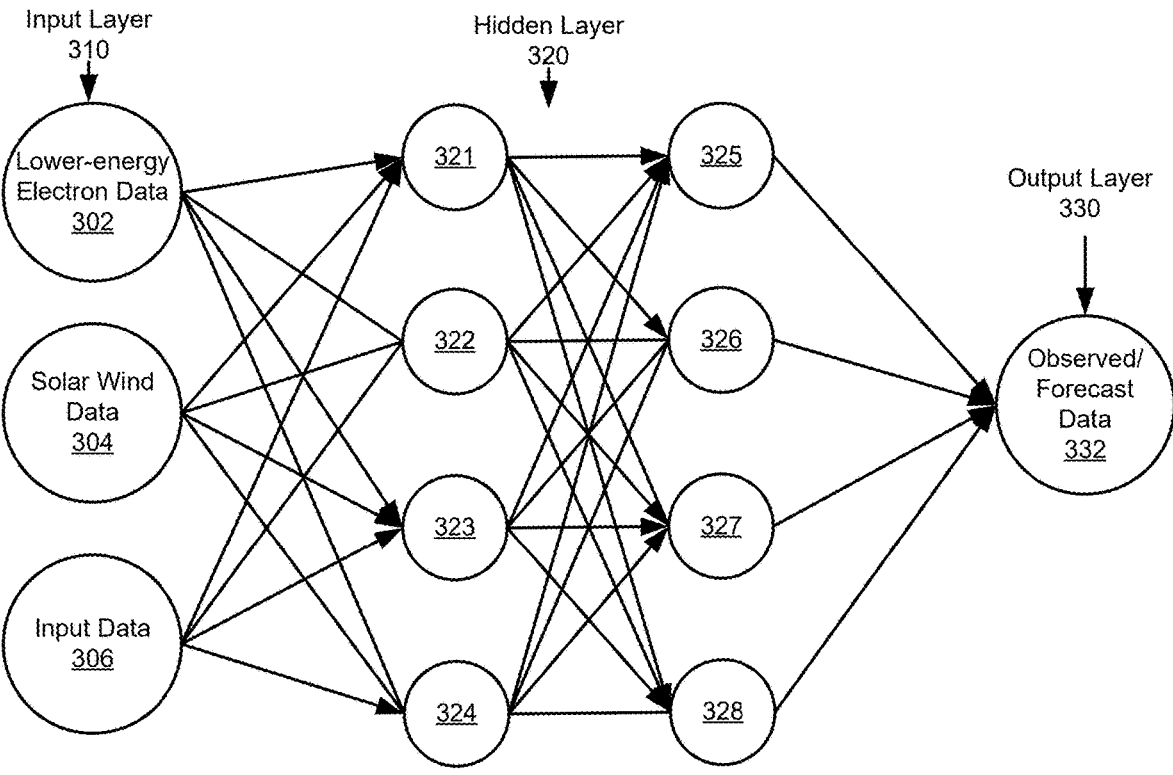
FIG. 3 shows a relational node diagram depicting an example of a feedforward neural network (FNN) for generating an ML model to forecast ultra-relativistic electron events, according to some embodiments.

FIG. 3 is a relational node diagram depicting an example of a Feedforward neural network for generating an ML model to forecast higher electron events, according to some embodiments. In an example embodiment, the neural network 300 utilizes an input layer 310, one or more hidden layers 320, and an output layer 330 to train the ML algorithm(s) or model to generate an ML model for forecasting higher electron events, e.g., greater than or equal to 2 MeV. In some embodiments, the observed data (i.e., higher electron events), have already been confirmed, supervised learning is used such that known input data, a weighted matrix, and known output data are used to gradually adjust the model to accurately compute the already known output. Once the model is trained, field data is applied as input to the model and a predicted output is generated. FIG. 3 is described as a structured learning model for depiction purposes and is not intended to be limiting.

Training of the neural network 300 using one or more training input matrices, a weight matrix, and one or more known outputs is initiated by one or more computers. In an embodiment, a server may run known input data through a deep neural network in an attempt to compute a particular known output. For example, a server uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computer then re-computes another output from the deep neural network with the input training matrix and the adjusted weight matrix. This process continues until the computer output matches the corresponding known output. The server computer then repeats this process for each training input dataset until a fully trained model is generated.

In the example of FIG. 3, the input layer 310 includes a plurality of training datasets that are stored as a plurality of training input matrices in a database associated with forecasting higher electron events. The training input data includes, for example, low-energy electron data 302 as described above, solar wind data 304 as described above, and input data 306 may be other types of data, e.g., data from GPS satellite, etc. Any type of input data can be used to train the model.

In an embodiment, low-energy electron data 302 is used as one type of input data to train the model, which is described above. In some embodiments, solar wind data 304 are also used as another type of input data to train the model, as described above. Moreover, in some embodiments, input data 306 are also used as another type of input data to train the model, as described above.

In the embodiment of FIG. 3, hidden layers 320 represent various computational nodes 321, 322, 323, 324, 325, 326, 327, 328. The lines between each node 321, 322, 323, 324, 325, 326, 327, 328 represent weighted relationships based on the weight matrix. As discussed above, the weight of each line is adjusted overtime as the model is trained. While the embodiment of FIG. 3 features two hidden layers 320, the number of hidden layers is not intended to be limiting. For example, one hidden layer, three hidden layers, ten hidden layers, or any other number of bidden layers may be used for a standard or deep neural network. The example of FIG. 3 also features an output layer 330 with the observed data 332 (i.e., higher electron events) as its known output. The observed data 332 indicates the observed electron intensities that define a higher electron events, e.g., higher fluxes of electrons greater than or equal to 2 MeV, as its known output. As discussed above, in this structured model, during training the observed data 332 is used as a target output for continuously adjusting the weighted relationships of the model. When the model is successfully trained, the model may be used to process live or field data, e.g., data from the input layer 310, to make real-time predictions of forecast data 332 as its output layer 330.

Once the neural network 300 of FIG. 3 is trained, the trained model will accept field data at the input layer 310, such as low-energy electron data and/or solar wind data, processing by a processor. In some embodiments, the field data is live data that is accumulated in real time. In other embodiments, the field data may be current data that has been saved in an associated database. The trained model is applied to the field data in order to forecast higher electron events at the output layer 330.

Referring now to FIG. 4, a flow diagram for generating an ensemble ML model is shown, according to some nonlimiting embodiments. At step 410, a plurality of data sets is received. The plurality of data sets may include a measured low-energy electrons that is less than or equal to 1.5 MeV, and wherein the plurality of data sets further includes data associated with solar wind (e.g., solar wind velocity, solar wind density, etc.). At step 420, measured data associated with higher electron events of greater than or equal to 2 MeV is received. At step 430, a plurality of ML models is generated based on a selection of at least two data sets from the plurality of data sets, and further based on a selection of one or more ML algorithms from a plurality of ML algorithms, and further based on a selection of a number of window size, as input data and the measured data associated with higher electron events of greater than or equal to 2 MeV as its output.

It is appreciated that a subset of the plurality of ML models is formed (selected) to form ensemble members. The ensemble group may be used to form an ensemble ML model, as described above. It is appreciated that once the ensemble ML model is generated, new input data, e.g., low-energy electrons, solar wind velocity, solar wind density, etc., can be used as an input in order for the ensemble ML model to predict a higher electron events.

Figure 5:
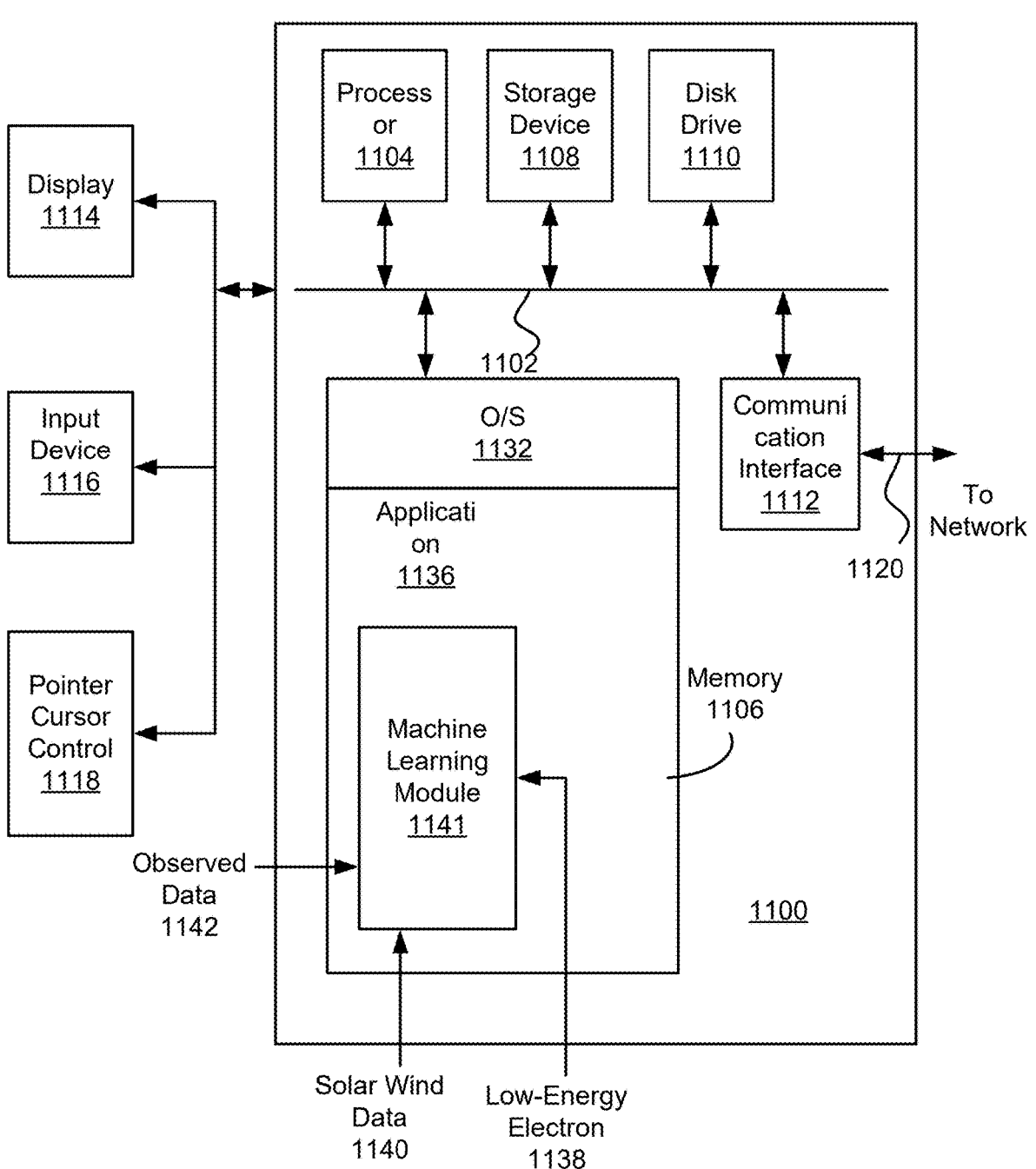
FIG. 5 shows a block diagram depicting an example of computer system suitable for generating ML models and/or generating ensemble model based on the generated ML models to forecast higher electron events in accordance with some embodiments.

FIG. 5 is a block diagram depicting an example of computer system suitable for generating ML models and/or generating ensemble model based on the generated ML models to forecast higher electron events in accordance with some embodiments. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operating system ("OS") 1132, an application 1136 (e.g., a host, server, web services-based, distributed (i.e., enterprise) application programming interface ("API"), program, procedure or others). Further, application 1136 includes a module of executable instructions associated with machine learning algorithm module 1141 to generate one or more ML models based on the observed data 1142 (as described above), based on the solar wind data 1140 (as described above), and further based on low-energy electron data 1138 (described above). The generated ML models may be used by the ML module 1141 and/or the processor 1104 to create an ensemble ML model that outperforms each member of the ensemble individually. It is appreciated that the generation of the ML model(s) and the ensemble transforms the system as shown to a special purpose computer that reliably forecasts higher electron events.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a band-held device. But in other embodiments, system 1100 can be implemented as a personal computer (i.e., a desktop computer) or any other computing device. In at least one embodiment, any of the above-described delivery systems can be implemented as a single system 1100 or can be implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, Python, and others. These can be varied and are not limited to the examples or descriptions provided.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system comprising:

one or more transmitters configured to transmit measured low-energy electrons that are less than or equal to 1.5 MeV, wherein the measured low-energy electrons include at least a first and a second set of data, wherein the first set of data is associated with a first electron count rate and wherein the second set of data is associated with a second electron count rate;

a receiver configured to receive the measured low-energy electrons from the one or more transmitters, and wherein the receiver is further configured to receive solar wind data as a third set of data, and wherein the receiver is further configured to receive data associated with observation of higher-electron events with greater than or equal to 2 MeV; and a processor configured to generate a plurality of machine learning (ML) models based on:

selection of one or more ML algorithms, selection of input data from at least two or more of the first set of data, the second set of data, and the third set of data, the data associated with the observation of higher-electron events with greater than or equal to 2 MeV, and selection of a window size, wherein a first generated ML model of the plurality of ML models based is different from a second generated ML model of the plurality of ML models, and wherein the processor is further configured to select a subset of ML models from the plurality of ML models to generate an ensemble ML model for predicting high-electron events of greater than or equal to 2 MeV.

2. The system of claim 1, wherein the processor is further configured to apply new data input to the generated ensemble ML model to predict higher-electron events of greater than or equal to 2 MeV.

3. The system of claim 1, wherein the measured low-energy electrons include a fourth set of data, and wherein the first set of data includes electron count rates of greater than 100 keV, the second set of data includes electron count rates of greater than 300 keV, and the third set of data includes electron count rates of greater than 1000 keV.

4. The system of claim 1, wherein the receiver is further configured to receive a derivative of the measured low-energy electrons, and wherein the processor is further configured to make a selection of input data including the derivative of the measured low-energy electrons.

5. The system of claim 1, wherein the solar wind data includes data associated with one or more of solar wind velocity and solar wind density.

6. The system of claim 1, wherein the one or more ML algorithms include linear regression, feedforward neural networks (FNN), long-short-term memory (LSTM), and convolutional neural network (CNN).

7. The system of claim 1, wherein the plurality of ML models is generated based on a combination of at least two or more different ML algorithms.

8. The system of claim 1, wherein the plurality of ML models is generated based on a combination of at least two or more input data.

9. The system of claim 1, wherein the plurality of ML models is generated based on a combination of at least two or more window sizes.

10. A system comprising:

a receiver configured to receive a measured low-energy electrons that is less than or equal to 1.5 MeV, wherein the measured low-energy electrons include at least a first and a second set of data, wherein the first set of data is associated with a first electron count rate and wherein the second set of data is associated with a second electron count rate, and wherein the receiver is further configured to receive solar wind data as a third set of data, and wherein the receiver is further configured to receive data associated with observation of higher-electron events with greater than or equal to 2 MeV; and a processor configured to generate a plurality of machine learning (ML) models based on:

selection of one or more ML algorithms, selection of input data from at least two or more of the first set of data, the second set of data, and the third set of data, the data associated with the observation of higher-electron events with greater than or equal to 2 MeV, and selection of a window size, wherein a first generated ML model of the plurality of ML models is different from a second generated ML model of the plurality of ML models, and wherein the processor is further configured to select a subset of ML models from the plurality of ML models to generate an ensemble ML model for predicting high-electron events of greater than or equal to 2 MeV.

11. The system of claim 10, wherein the processor is further configured to apply new data input to the generated ensemble ML model to predict higher-electron events of greater than or equal to 2 MeV.

12. The system of claim 10, wherein the measured low-energy electrons include a fourth set of data, and wherein the first set of data includes electron count rates of greater than 100 keV, the second set of data includes electron count rates of greater than 300 keV, and the third set of data includes electron count rates of greater than 1000 keV.

13. The system of claim 10, wherein the receiver is further configured to receive a derivative of the measured low-energy electrons, and wherein the processor is further configured to make a selection of input data including the derivative of the measured low-energy electrons.

14. The system of claim 10, wherein the solar wind data includes data associated with one or more of solar wind velocity and solar wind density.

15. The system of claim 10, wherein the one or more ML algorithms include linear regression, feedforward neural networks (FNN), long-short-term memory (LSTM), and convolutional neural network (CNN).

16. A method comprising:

receiving a plurality of data sets, wherein the plurality of data sets includes a measured low-energy electrons that is less than or equal to 1.5 MeV, and wherein the plurality of data sets further includes data associated with solar wind;

receiving measured data associated with higher-electron events of greater than or equal to 2 MeV; and in response to a selection of at least two data sets from the plurality of data sets, and further in response to a selection of one or more machine learning (ML) algorithms from a plurality of ML algorithms, and further in response to a selection of a window size, generating a plurality of ML models based on the selections as an input and the measured data associated with higher electron events of greater than or equal to 2 MeV for predicting high-electron events of greater than or equal to 2 MeV.

17. The method of claim 16 further comprising, forming an ensemble of ML models in response to a selection of a subset of ML models from the plurality of ML models.

18. The method of claim 17 further comprising, generating an ensemble ML model based on the ensemble of ML models, wherein the ensemble ML model is a statistical mean of the subset of ML models at a measured L-shell, wherein L-shell is equatorial distances to earth.

19. The method of claim 16 further comprising, generating an ensemble ML model based on a selection of a subset of ML models of the plurality of ML models.

20. The method of claim 19 further comprising:

receiving new data sets that include a selection from the measured low-energy electrons that is less than or equal to 1.5 MeV and the data associated with solar wind; and applying the new data sets as input to the ensemble ML model to predict higher electron events of greater than or equal to 2 MeV.

21. The method of claim 16, wherein the one or more ML algorithms include linear regression, feedforward neural networks (FNN), long-short-term memory (LSTM), and convolutional neural network (CNN).

22. The method of claim 16, wherein the solar wind data includes data associated with one or more of solar wind velocity and solar wind density.

23. The method of claim 16, wherein the measured low-energy electrons include data sets for electron count rates of greater than 100 keV, electron count rates of greater than 300 keV, and electron count rates of greater than 1000 keV.

* * * * *